(12) United States Patent
Takeuchi et al.

(10) Patent No.: US 8,171,526 B2
(45) Date of Patent: May 1, 2012

(54) SERVICE PROVIDING SYSTEM, INFORMATION PROCESSING APPARATUS, SERVICE PROVIDING SERVER AND SERVICE PROVIDING METHOD

(75) Inventors: Sachiko Takeuchi, Tokyo (JP); Toru Matsuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1079 days.

(21) Appl. No.: 11/240,511

(22) Filed: Oct. 3, 2005

(65) Prior Publication Data

US 2006/0075474 A1 Apr. 6, 2006

(30) Foreign Application Priority Data

Oct. 5, 2004 (JP) ................................. 2004-292813
Sep. 28, 2005 (JP) ................................. 2005-282063

(51) Int. Cl.
*G06F 7/04* (2006.01)

(52) U.S. Cl. ......... 726/3; 726/4; 726/5; 726/10; 726/27; 713/156; 713/158; 713/169; 713/173; 713/201

(58) Field of Classification Search ................ 726/3, 12, 726/28, 4, 27, 5; 713/155, 161, 168, 156, 713/158, 173, 201; 711/138
See application file for complete search history.

(56) References Cited

U.S. PATENT DOCUMENTS

| | | | |
|---|---|---|---|
| 6,938,171 B1 * | 8/2005 | Isomichi et al. ................. | 726/12 |
| 2001/0000358 A1 * | 4/2001 | Isomichi et al. ................. | 713/201 |
| 2002/0168962 A1 * | 11/2002 | Kurakake et al. ............... | 455/411 |
| 2003/0135734 A1 * | 7/2003 | Fagan et al. .................... | 713/169 |
| 2003/0218771 A1 | 11/2003 | Mihira | |
| 2004/0030986 A1 | 2/2004 | Matsuda | |
| 2004/0070782 A1 | 4/2004 | Mihira | |
| 2004/0080771 A1 | 4/2004 | Mihira et al. | |
| 2004/0187061 A1 | 9/2004 | Matsuda | |
| 2004/0199538 A1 | 10/2004 | Matsuda et al. | |
| 2004/0227968 A1 | 11/2004 | Nakamura et al. | |

(Continued)

FOREIGN PATENT DOCUMENTS

EP    1 507 381 A2    2/2005

(Continued)

OTHER PUBLICATIONS

Bai Li et al "Fuzzy classification by a CMAC network".Dept. of Comput., Nottingham Trent Univ., UK; Proceedings. Ninth IEEE International Conference on Tools with Artificial Intelligence (Cat. No. 97CB36147) p. Nos. 392-5 Publisher: IEEE, Publication Date: 1997.*

(Continued)

*Primary Examiner* — Taghi Arani
*Assistant Examiner* — Jason Lee
(74) *Attorney, Agent, or Firm* — Oblon, Spivak, McClelland, Maier & Neustadt, L.L.P.

(57) ABSTRACT

A service providing system is disclosed. The service providing system includes an information processing apparatus and a service providing server, each having an authentication mechanism, that are connected via a network, wherein the information processing apparatus and the service providing server provides a service in response to a request by an authenticated user. The information processing apparatus includes: an information obtaining part for obtaining authentication information for performing authentication in the service providing server wherein the authentication information is associated with a user authenticated in the information processing apparatus; and a process request part for sending a process request including the authentication information to the service providing server.

8 Claims, 29 Drawing Sheets

U.S. PATENT DOCUMENTS

| | | |
|---|---|---|
| 2005/0044248 A1 | 2/2005 | Mihira et al. |
| 2005/0066163 A1* | 3/2005 | Ikenoya .................. 713/156 |
| 2005/0134902 A1 | 6/2005 | Mihira et al. |
| 2006/0021004 A1* | 1/2006 | Moran et al. .................. 726/2 |
| 2006/0059564 A1* | 3/2006 | Tan et al. .................. 726/27 |
| 2007/0044146 A1* | 2/2007 | Murase et al. .................. 726/10 |

FOREIGN PATENT DOCUMENTS

| | | |
|---|---|---|
| JP | 9-34822 | 2/1997 |
| JP | 2002-84383 | 3/2002 |
| JP | 2003-122514 | 4/2003 |
| JP | 2004-185396 | 7/2004 |
| JP | 2004185396 A * | 7/2004 |
| WO | WO 01/55819 A1 | 8/2001 |
| WO | WO 0155819 A1 * | 8/2001 |

OTHER PUBLICATIONS

Office Action issued Jun. 28, 2011, in Japanese Patent Application No. 2005-282063.

* cited by examiner

FIG.14

| | AUTHENTICATION INFORMATION SENT TO THE DISTRIBUTION SERVER |
|---|---|
| WHEN IMAGE FORMING APPARATUS HAS CORRESPONDING TABLE | AUTHENTICATION INFORMATION B (UCS CONVERTS) |
| WHEN DISTRIBUTION SERVER HAS CORRESPONDING TABLE | AUTHENTICATION INFORMATION A (DISTRIBUTION SERVER CONVERTS) |
| WHEN DIRECTORY SERVER HAS CORRESPONDING TABLE | AUTHENTICATION INFORMATION B (DIRECTORY SERVER CONVERTS) |
| WHEN IMAGE FORMING APPARATUS AND DISTRIBUTION SERVER USE COMMON ADDRESS BOOK | AUTHENTICATION INFORMATION A (DISTRIBUTION SERVER USES IT WITHOUT CONVERSION) |

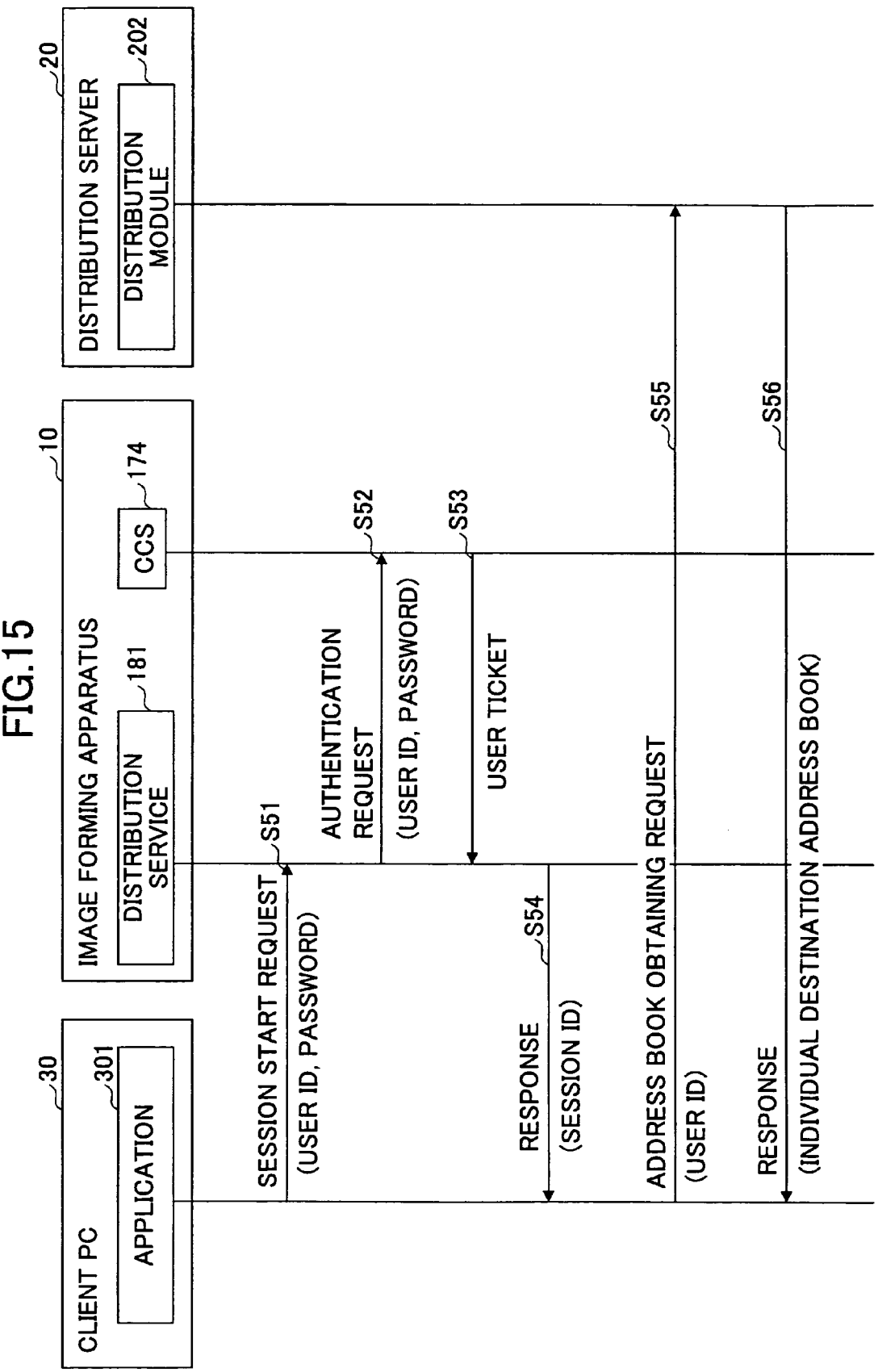

| USER ID | AUTHENTICATION INFORMATION MANAGED BY ADDRESS BOOK | | |
| --- | --- | --- | --- |
| | IMAGE FORMING APPARATUS | DISTRIBUTION SERVER | WORKFLOW SERVER |
| | | SERVER URL : htttp://12.23.34.5/delivery | SERVER URL : htttp://12.23.34.7/workflow |
| User 1 | AAA | aaaa | Aa |
| User 2 | BB | bbbb | Bb |
| | | | |

| USER ID | AUTHENTICATION INFORMATION MANAGED BY ADDRESS BOOK | | |
|---|---|---|---|
| | IMAGE FORMING APPARATUS | DISTRIBUTION SERVER | WORKFLOW SERVER |
| | | SERVER URL: htttp://12.23.34.5/delivery | SERVER URL: htttp://12.23.34.7/workflow |
| User 1 | ID : suzuki<br>Password : AAA | ID : Suzuki<br>Password : aaaa | ID : Suzuki<br>Password : Aa |
| User 2 | ID : yamada<br>Password : BB | ID : Yamada<br>Password : bbbb | ID : Yamada<br>Password : Bb |

| | PUBLIC KEY |
|---|---|
| IMAGE FORMING APPARATUS | Abcdef··· |
| DIRECTORY SERVER | 111222333··· |

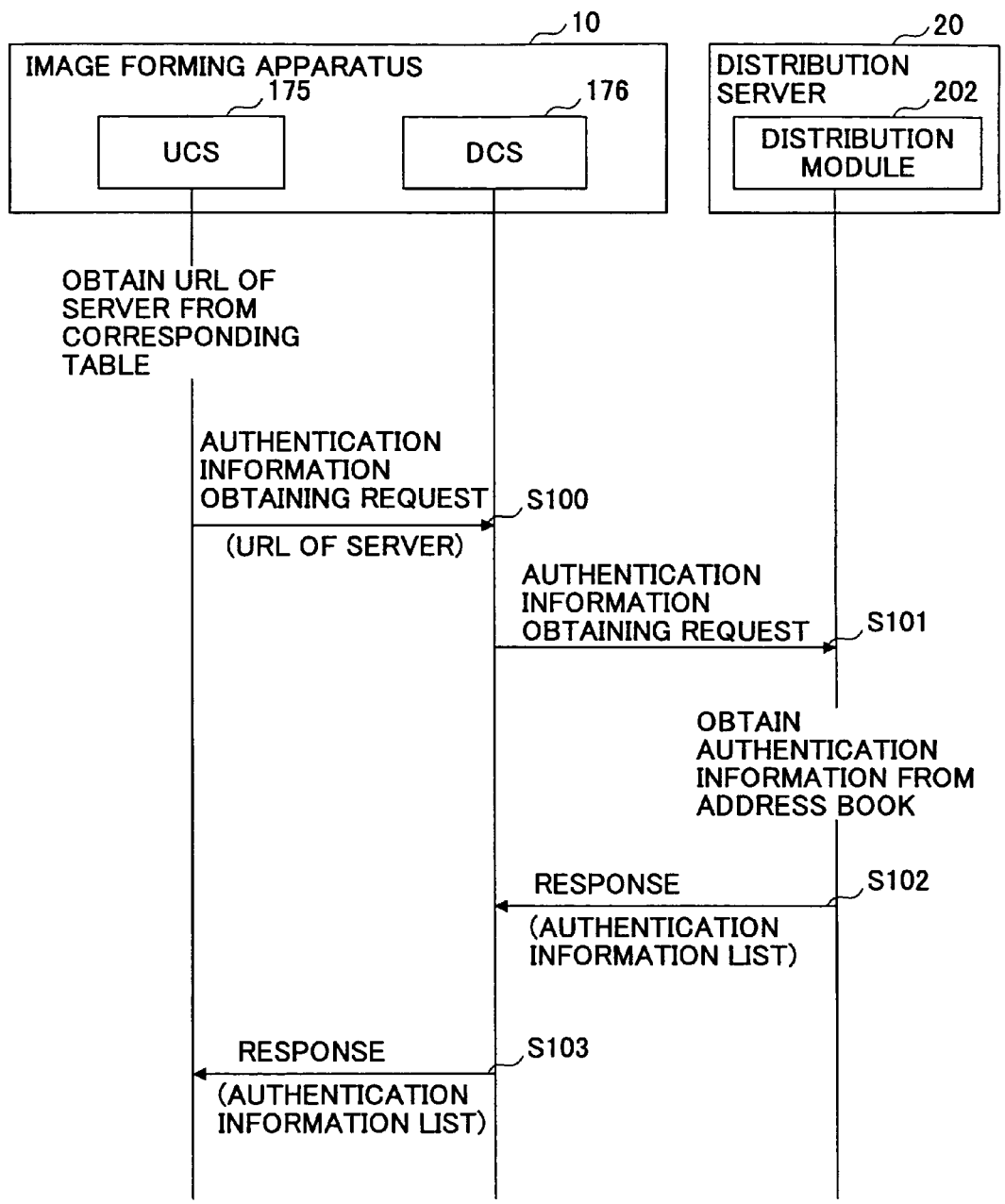

SERVICE PROVIDING SYSTEM, INFORMATION PROCESSING APPARATUS, SERVICE PROVIDING SERVER AND SERVICE PROVIDING METHOD

BACKGROUND OF THE INVENTION

1. Field of the Invention

The present invention relates to a service providing system, an information processing apparatus, a service providing server and a service providing method. More particularly, the present invention relates to an information processing apparatus and a service providing server that require authentication, and a service providing system including the information processing apparatus and the service providing server, and relates to a user authentication method performed by the information processing apparatus and the service providing server.

2. Description of the Related Art

In recent years, in order to share software resources or hardware resources, plural servers and apparatuses are connected to a network such as a LAN (Local Area Network) and the Internet and the like (refer to patent document 1, for example).

In ordinary cases, for using the plural servers and the apparatuses on the network such as the LAN or the Internet, it is necessary to perform authentication for each of the servers and the apparatuses. FIG. 1 is a block diagram showing an example of a system using the servers and the apparatuses.

In the system shown in FIG. 1, based on a request from the client PC 30, a document stored in an image forming apparatus 10 is transferred to a distribution server 20. In this example, it is assumed that authentication information of the image forming apparatus 10 is authentication information [A], and that authentication information of the distribution server 20 is authentication information [B]. In the system shown in FIG. 1, since the authentication information [A] of the image forming apparatus 10 is different from the authentication information [B] of the distribution server 20, it is necessary to perform authentication for each of the image forming apparatus 10 and the distribution server 20.

FIG. 2 shows a block diagram of another example of a system using the plural servers and apparatuses. In the system of FIG. 2, based on operation on an operation panel of the image forming apparatus 10, a document stored in the image forming apparatus 10 is transferred to the distribution server 20. For example, in the case of operation from the operation panel in the system shown in FIG. 2, there are many cases in which authentication for the distribution server 20 is omitted although authentication for the image forming apparatus 10 is performed.

[Patent Document 1] Japanese Laid-Open Patent Application No. 2003-122514

In the system shown in FIG. 1, it is necessary to perform authentication for each of the image forming apparatus 10 and the distribution server 20. Therefore, as the number of servers and apparatuses increases, necessary number of times of authentication increases, so that there is a problem in that the user operating the client PC 30 is forced to perform complicated works.

In the case of the system of FIG. 2, although authentication is performed in the image forming apparatus 10, authentication in the distribution server 20 is omitted. In ordinary cases, when the image forming apparatus 10 transfers a stored document to the distribution server 20, the sender can be selected freely. Therefore, there is a problem in that the user of the image forming apparatus 10 can perform "spoofing of sender".

Even in the case of the system shown in FIG. 2, when authentication is performed for each of the image forming apparatus 10 and the distribution server 20, there is a problem in that a user operating the operation panel is forced to perform complicated works.

SUMMARY OF THE INVENTION

The present invention is contrived in view of the above-mentioned problems, and an object of the present invention is to provide a service providing system, an information processing apparatus, a service providing server and a service providing method for keeping security level high without forcing the user to perform complicated works.

The object is achieved by a service providing system including an information processing apparatus and a service providing server, each having an authentication mechanism, that are connected via a network, wherein the information processing apparatus and the service providing server provides a service in response to a request by an authenticated user, the information processing apparatus including:

an information obtaining part for obtaining authentication information for performing authentication in the service providing server wherein the authentication information is associated with a user authenticated in the information processing apparatus; and a process request part for sending a process request including the authentication information to the service providing server.

The object is also achieved by an information processing apparatus that is connected to a service providing server having an authentication mechanism, wherein the information processing apparatus sends a process request to the service providing server in response to a request by an authenticated user, the information processing apparatus including:

an information obtaining part for obtaining authentication information for performing authentication in the service providing server wherein the authentication information is associated with a user authenticated in the information processing apparatus; and a process request part for sending a process request including the authentication information to the service providing server.

The object is also achieved by a service providing server that is connected to an information processing apparatus having an authentication mechanism, wherein the service providing server provides a service in response to a request by an authenticated user, the service providing server including:

an information obtaining part for obtaining authentication information included in a process request in response to receiving the process request from the information processing apparatus; and a process execution part for executing a process corresponding to the process request after authentication is successfully completed using the authentication information.

The object is also achieved by a service providing method in a service providing system including an information processing apparatus and a service providing server, each having an authentication mechanism, that are connected via a network, wherein the information processing apparatus and the service providing server provides a service in response to a request by an authenticated user, wherein:

the information processing apparatus obtains authentication information for performing authentication in the service providing server wherein the authentication information is associated with a user authenticated in the information processing apparatus; and the information processing apparatus sends a process request including the authentication information to the service providing server.

In the present invention, the information processing apparatus obtains the authentication information, associated with the authenticated user, for performing authentication in the service providing server, so that the service providing server can perform user authentication with the authentication information.

That is, the user needs to perform operation for authentication only for the information processing apparatus, so that authentication for more than one service providing server that requires authentication can be performed. In addition, since the process request from the information processing apparatus to the service providing server includes authentication information associated with the user authenticated in the information processing apparatus, "Spoofing of sender" can be prevented so that the security level can be kept high.

According to the present invention, a service providing system, an information processing apparatus, a service providing server and a service providing method for keeping security level high without forcing the user to perform complicated works can be provided.

BRIEF DESCRIPTION OF THE DRAWINGS

Other objects, features and advantages of the present invention will become more apparent from the following detailed description when read in conjunction with the accompanying drawings, in which:

FIG. 14 is a diagram indicating authentication information to be sent from the image forming apparatus to the distribution server for each case for explaining differences of authentication information for each case;

FIG. 15 is a sequence diagram showing processes from session start to obtaining address book;

FIG. 24 shows an example of the authentication information corresponding table managed in the image forming apparatus;

FIG. 25 shows another example of the authentication information corresponding table managed in the image forming apparatus;

FIG. 26 shows an example of the apparatus authentication information corresponding table managed in the distribution server.

FIG. 27 is a sequence diagram representing a synchronization process of the address book;

DETAILED DESCRIPTION OF THE PREFERRED EMBODIMENTS

In the following, preferred embodiments of the present invention are described with reference to figures. Although an image forming apparatus is described as an example of the information processing apparatus, any information processing apparatus that requires authentication can be used. In addition, although a distribution server and a workflow server are described as examples of the service providing server in this embodiment, any service providing server that requires authentication can be used.

Figure 1:
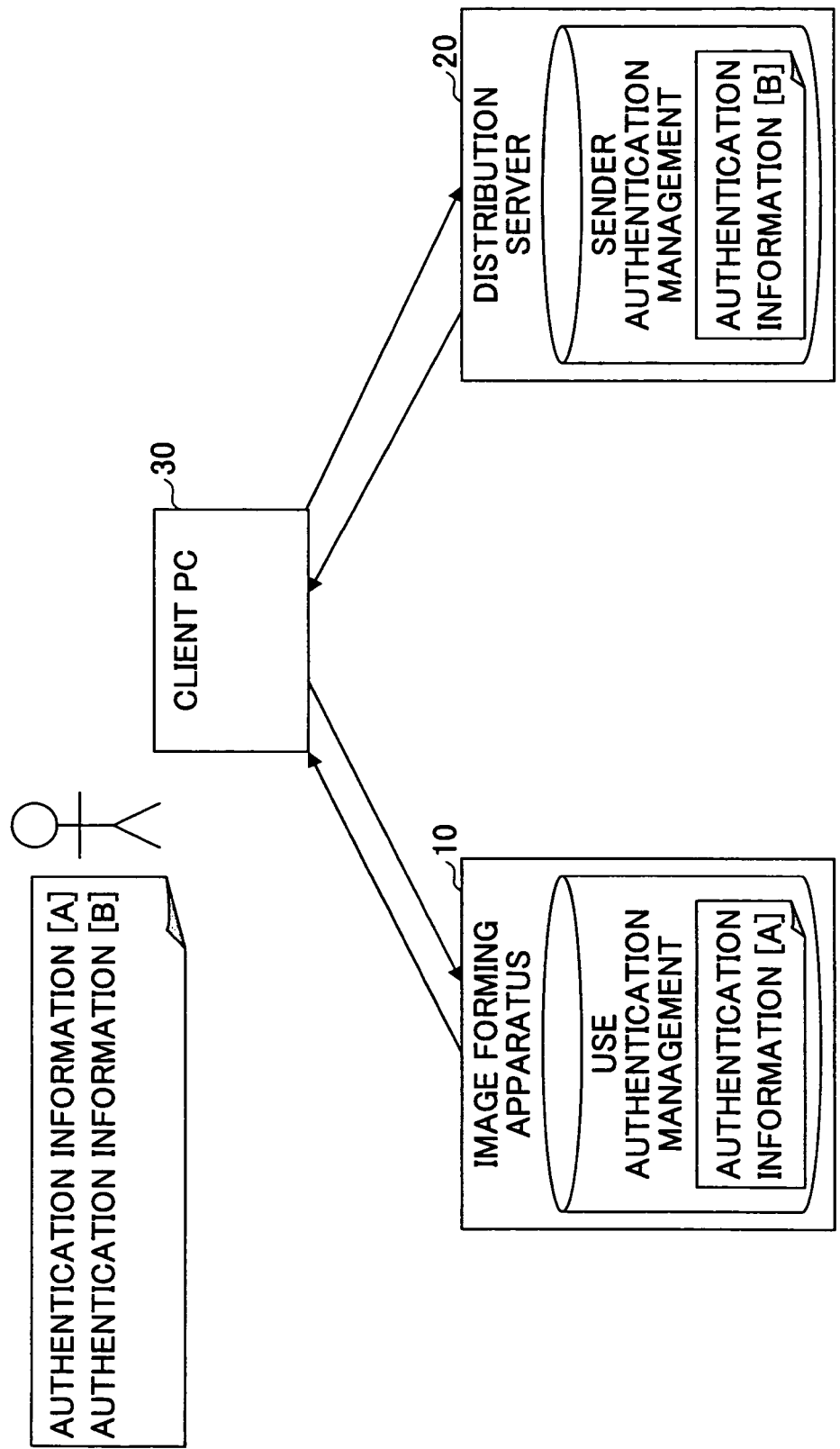
FIG. 1 is a block diagram showing an example of a system using plural servers and apparatuses.
Figure 2:
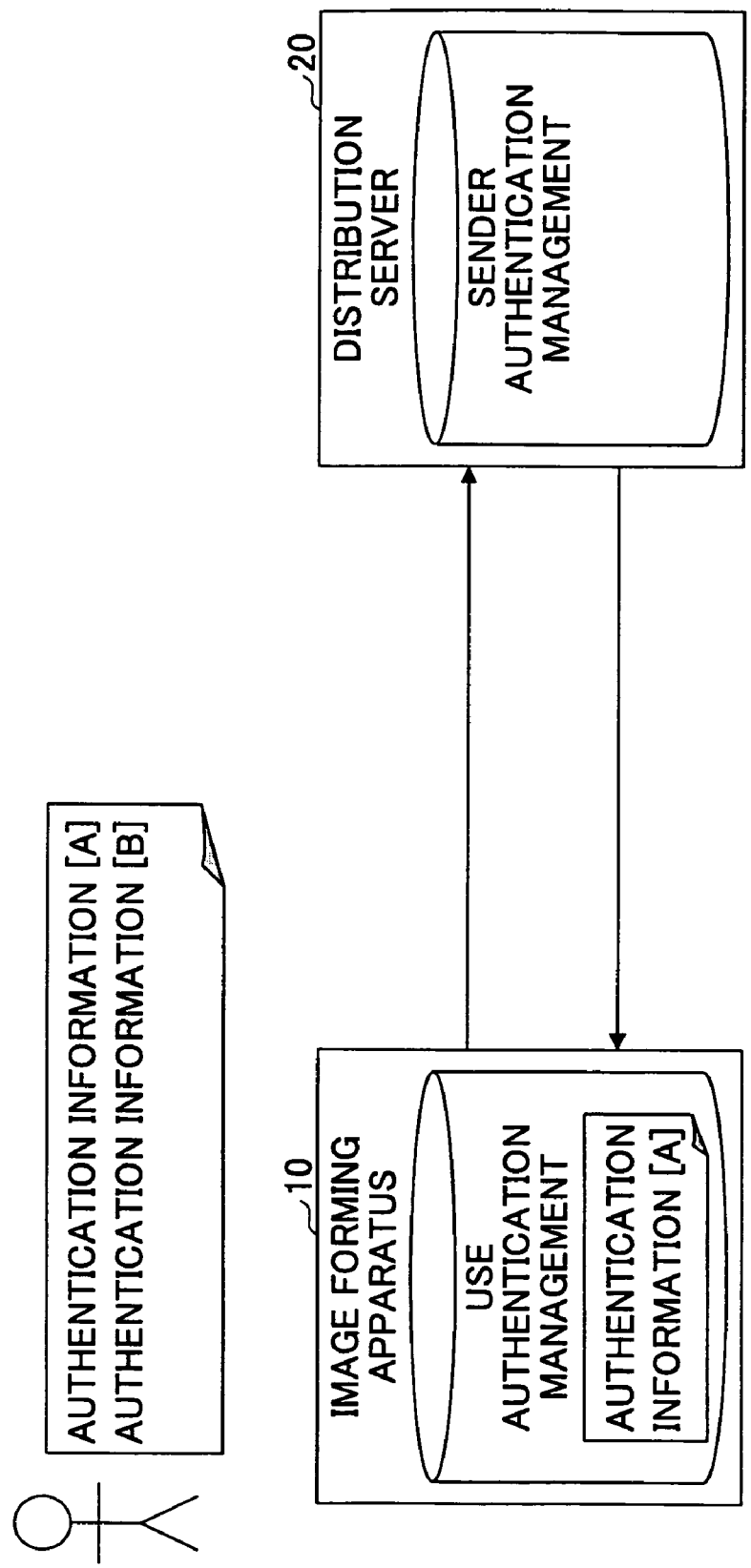
FIG. 2 is a block diagram showing another example of a system using plural servers and apparatuses.
Figure 3:
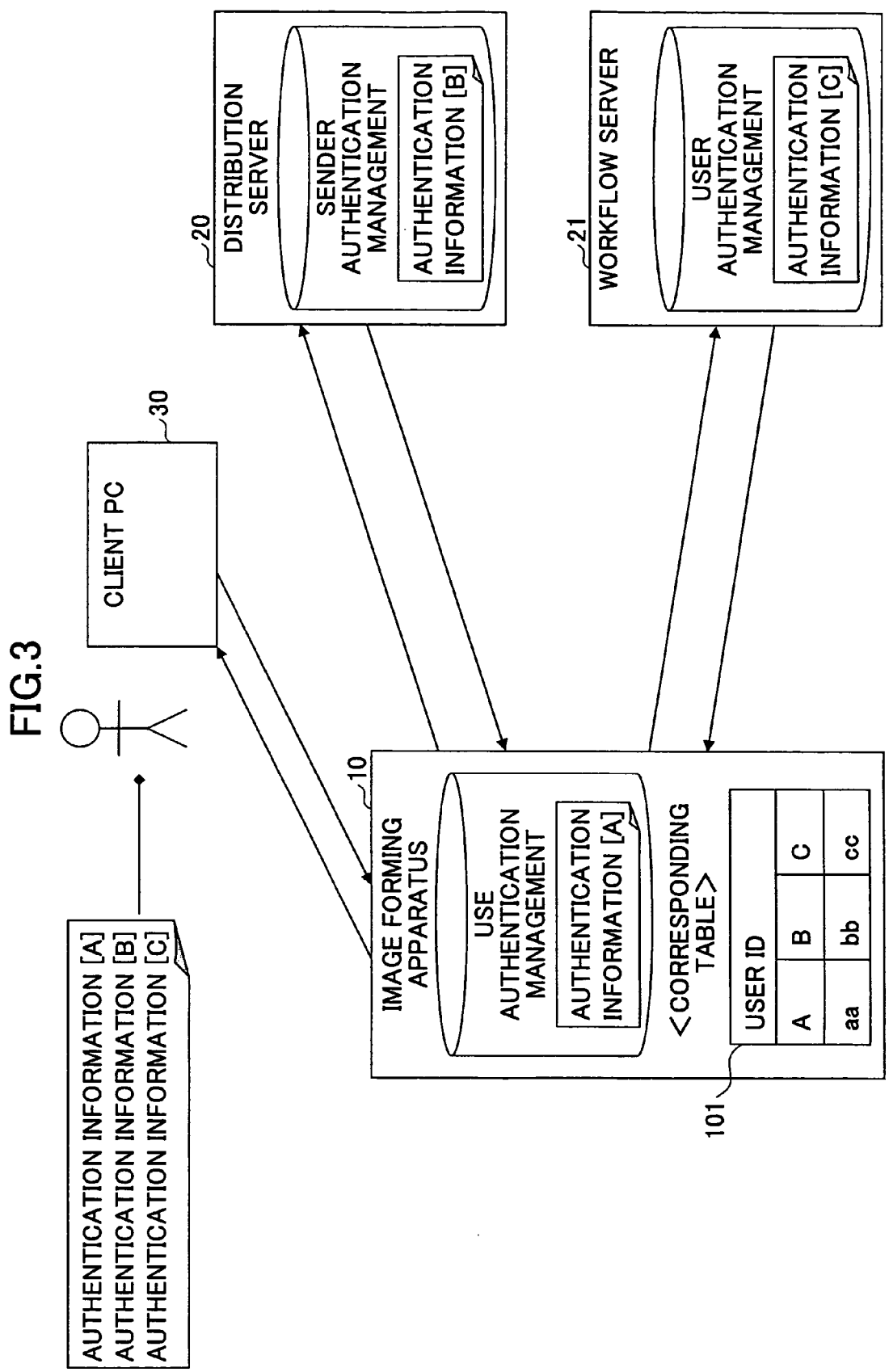
FIG. 3 is a principle diagram for explaining an example of a user authentication method of the present invention.

FIG. 3 is a principle diagram for explaining an example of a user authentication method. The system shown in FIG. 3 includes an image forming apparatus 10, a distribution server 20, a workflow server 21 and a client PC 30 that are connected each other via a network (not shown in the figure) such as a LAN or the Internet. For example, in the system shown in FIG. 3, based on a request from the client PC 30, a document stored in the image forming apparatus 10 is sent to the distribution server 20 or is registered to the workflow server 21.

The request of the user input into the client PC 30 may directly designate a service of the distribution server 20 or the workflow server 21, or may be designate the service indirectly.

In addition, in the system shown in FIG. 3, each of the image forming apparatus 10, the distribution server 20 and the workflow server 21 independently has an authentication mechanism. Therefore, the system shown in FIG. 3 needs to perform authentication in each of the image forming apparatus 10, the distribution server 20 and the workflow server 21.

In the following description, it is assumed that authentication information for the image forming apparatus 10 is authentication information [A], authentication information for the distribution server 20 is authentication information [B] and authentication information of the workflow server 21 is authentication information [C]. First, the user operating the client PC 30 performs authentication in the image forming apparatus 10 using the authentication information [A].

When a document is sent to the distribution server 20 based on a request from the client PC 30, the image forming apparatus 10 obtains the authentication information [B] of the distribution server 20 from an authentication information corresponding table 101 in the image forming apparatus 10 based on a user ID of the user authenticated with the authentication information [A]. In the authentication information corresponding table 101, the user ID of the user, the authentication information [A] of the image forming apparatus 10, the authentication information [B] of the distribution server 20 and the authentication information [C] of the workflow server 21 are associated with each other. Therefore, the image forming apparatus 10 can request the distribution server 20 to perform authentication with the authentication information [B].

When a document is registered in the workflow server 21 based on a request from the client PC 30, the image forming apparatus 10 obtains the authentication information [C] of the workflow server 21 from the authentication information corresponding table 101 in the image forming apparatus 10 based on the user ID of the user authenticated with the authentication information [A]. Therefore, the image forming apparatus 10 can request the workflow server 21 to perform authentication with the authentication information [C].

In the system shown in FIG. 3, only by performing authentication once with the authentication information [A] by the user operating the client PC 30, the image forming apparatus 10 can obtain the authentication information [B] of the distribution server 20 and the authentication information [C] of the workflow server 21 from the authentication information corresponding table 101. Therefore, even though the number of the service providing servers increases, it is adequate for the user to input the authentication information [A] only once.

In addition, in the system shown in FIG. 3, the user ID of the user authenticated with the authentication information [A] is included in a distribution request from the image forming apparatus 10 to the distribution server 20, and the user ID of the user authenticated with the authentication information [A] is included in a registration request from the image forming apparatus to the workflow server 21. By including the user ID of the user authenticated in the image forming apparatus 10, "spoofing of sender" can be effectively prevented.

In the system of FIG. 3, although the authentication information corresponding table 101 is provided in the image forming apparatus 10, the authentication information corresponding table 101 can be provided in the distribution server 20 or the workflow server 21. In addition, the authentication information corresponding table 101 may be provided in an after-mentioned directory server. The directory server is an example of an external apparatus connected via the network. Details of operations in the cases where the authentication information corresponding table 101 is provided outside of the image forming apparatus 10 are described later.

In addition, in the system shown in FIG. 3, although the authentication information corresponding table 101 is used, by synchronizing the authentication information [A] of the image forming apparatus 10, the authentication information [B] of the distribution server and the authentication information [C] of the workflow server 21, it is not necessary to use the authentication information corresponding table 101.

By performing authentication operation for the image forming apparatus 10 only once, authentication in the distribution server 20 and the workflow server 21 that require authentication can be performed easily. In addition, since the user ID of the user authenticated in the image forming apparatus 10 is included in the process request to each of the distribution server 20 and the workflow server 21 from the image forming apparatus 10, "spoofing of sender" can be prevented so that the security level can be kept high.

Figure 4:
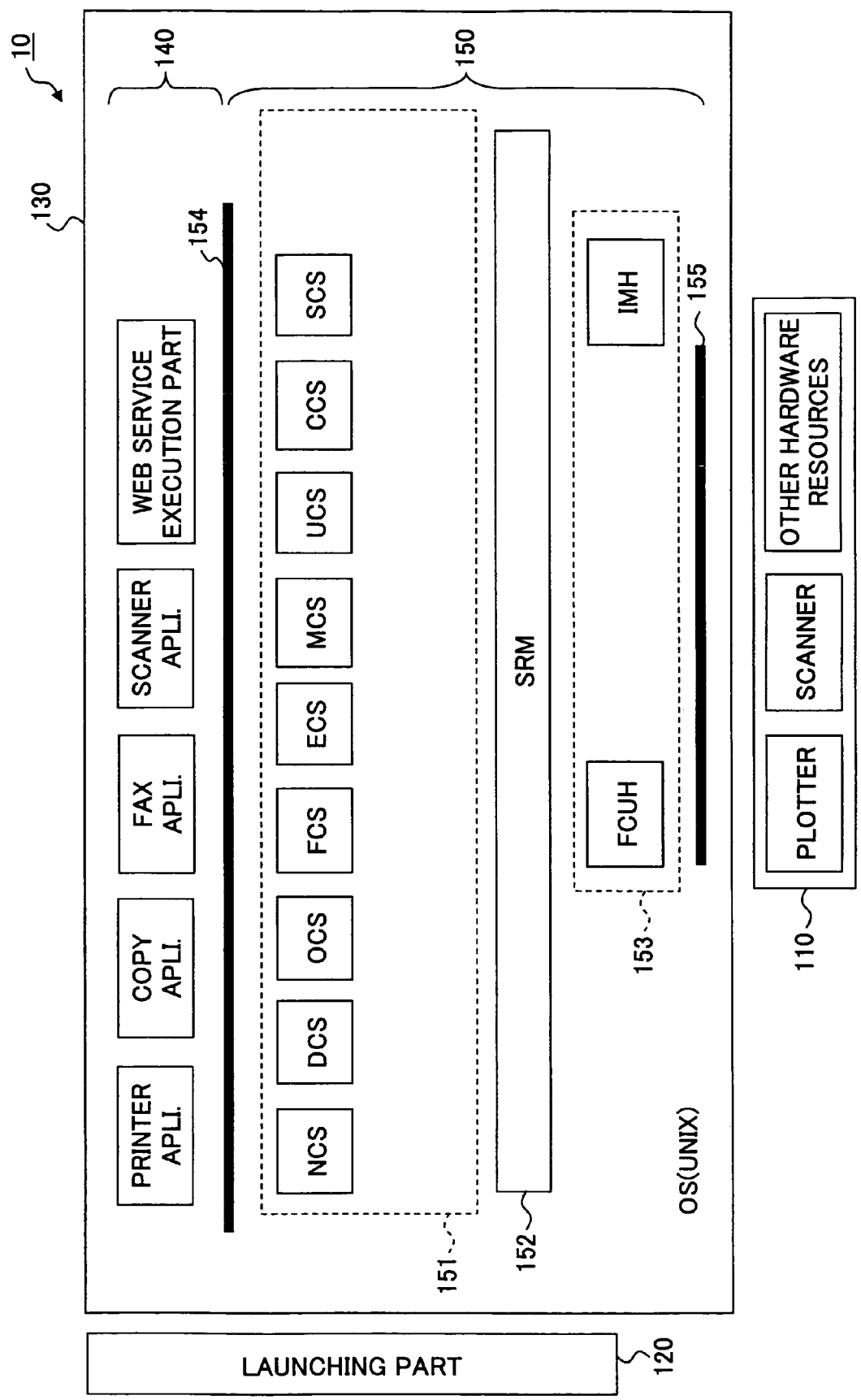
FIG. 4 is a block diagram of an embodiment of an image forming apparatus of the present invention.

Next, a configuration of an example of the image forming apparatus 10 is described. FIG. 4 is a block diagram of an embodiment of the image forming apparatus of the present invention. The image forming apparatus 10 includes hardware resources 110, a launch part 120 and a software group 130.

The hardware resources 110 includes a plotter, a scanner, and other hardware resources. The software group 130 includes applications 140 and a platform 150 executed on an OS (operating system) such as the UNIX. The launch part 120 is executed first when the power of the image forming apparatus 10 is turned on, and launches the applications 140 and the platform 150 on the OS.

The applications 140 include a printer application, a copy application, a fax application, a scanner application and a web service execution part. The platform 150 includes control services 151, a SRM (system resource manager) 152, and a handler layer 153. The platform 150 is configured to include APIs (application program interface) 154.

The control service 151 includes a NCS (network control service), a DCS (delivery control service), an OCS (operation panel control service), a FCS (fax control service), a ECS (engine control service), a MCS (memory control service) and a UCS (user information control service), a CCS (certification control service) and a SCS (system control service).

A handler layer 153 includes a FCUH (fax control unit handler) and an IMH (image memory handler). Details of functions and operations of each block of the image forming apparatus 10 shown in FIG. 4 are disclosed in Japanese Laid-Open patent Application No. 2002-84383, for example.

Figure 5:
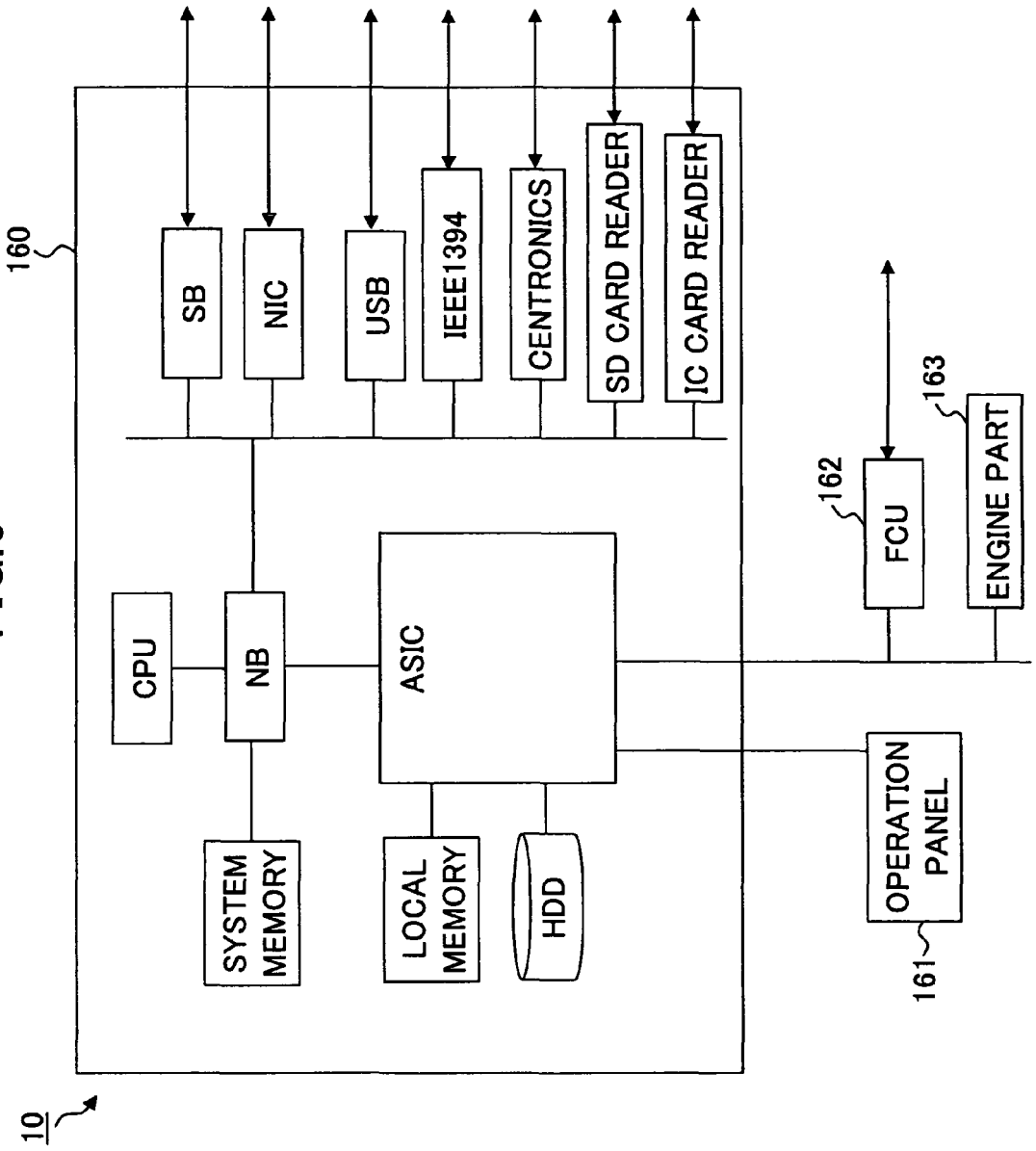
FIG. 5 is a hardware block diagram of an embodiment of the image forming apparatus of the present invention.

FIG. 5 shows a hardware block diagram of an embodiment of the image forming apparatus 10 of the present invention. The image forming apparatus 10 includes a controller 160, an operation panel 161, a FCU 162 and an engine part 163.

The controller 160 includes a CPU, a system memory, a local memory, a HDD (hard disk drive), a NB (north bridge), a ASIC, a SB (south bridge), a NIC (network interface card), a USBI/F, an IEEE 1394 I/F, a Centronics I/F, a SD card reader and an IC card reader. Details of functions and operations of each block of the image forming apparatus 10 shown in FIG. 5 are disclosed in Japanese Laid-Open patent Application No. 2002-84383, for example.

In the following, processing for delivering a document stored in the image forming apparatus 10 to the distribution server 20 is described as a first embodiment. In addition, processing for registering a document stored in the image forming apparatus 10 to the workflow server 21 is described as a second embodiment.

First Embodiment

Figure 6:
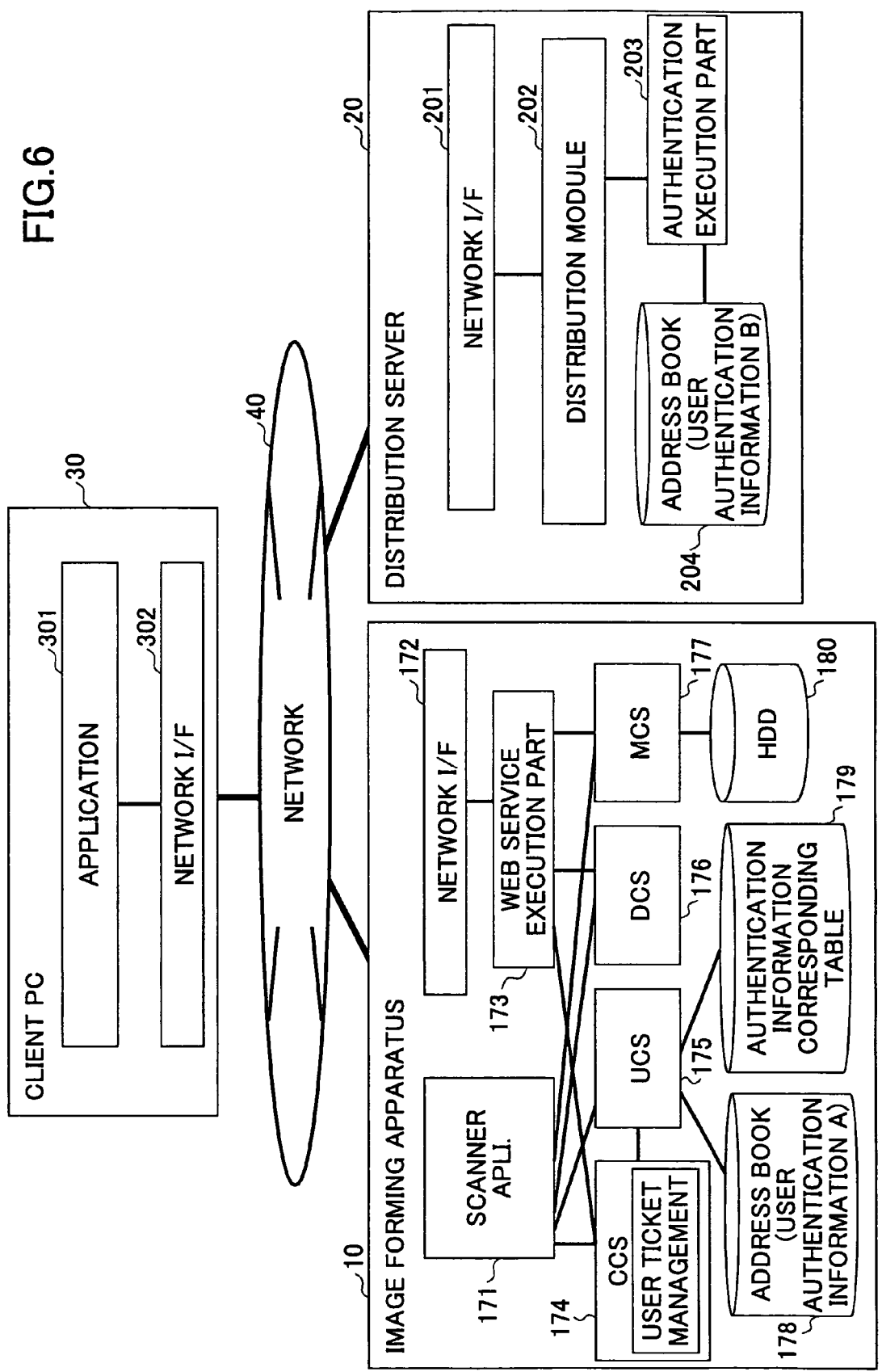
FIG. 6 is a block diagram of an embodiment of a system for realizing a user authentication method of the present invention.

FIG. 6 is a block diagram of an embodiment of a system for realizing a user authentication method of the present invention. The system shown in FIG. 6 is an example in which the authentication information corresponding table is stored in the image forming apparatus 10. The system of FIG. 6 includes the image forming apparatus 10, the distribution server 20 and the client PC 30 that are connected via the network 40. In the configurations of the image forming apparatus 10, distribution server 20 and the client PC 30 shown in FIG. 6, components that are unnecessary for description are omitted.

The image forming apparatus 10 includes a scanner application 171, a network I/F 172, a Web service execution part 173, a CCS 174, a UCS 175, a DCS 176, a MCS 177, an address book 178, an authentication information corresponding table 179 and a HDD 180. The distribution server 20 includes a network I/F 201, a distribution module 202, an authentication execution part 203 and an address book 204. The client PC 30 includes an application 301 and a network I/F 302.

Figure 7:
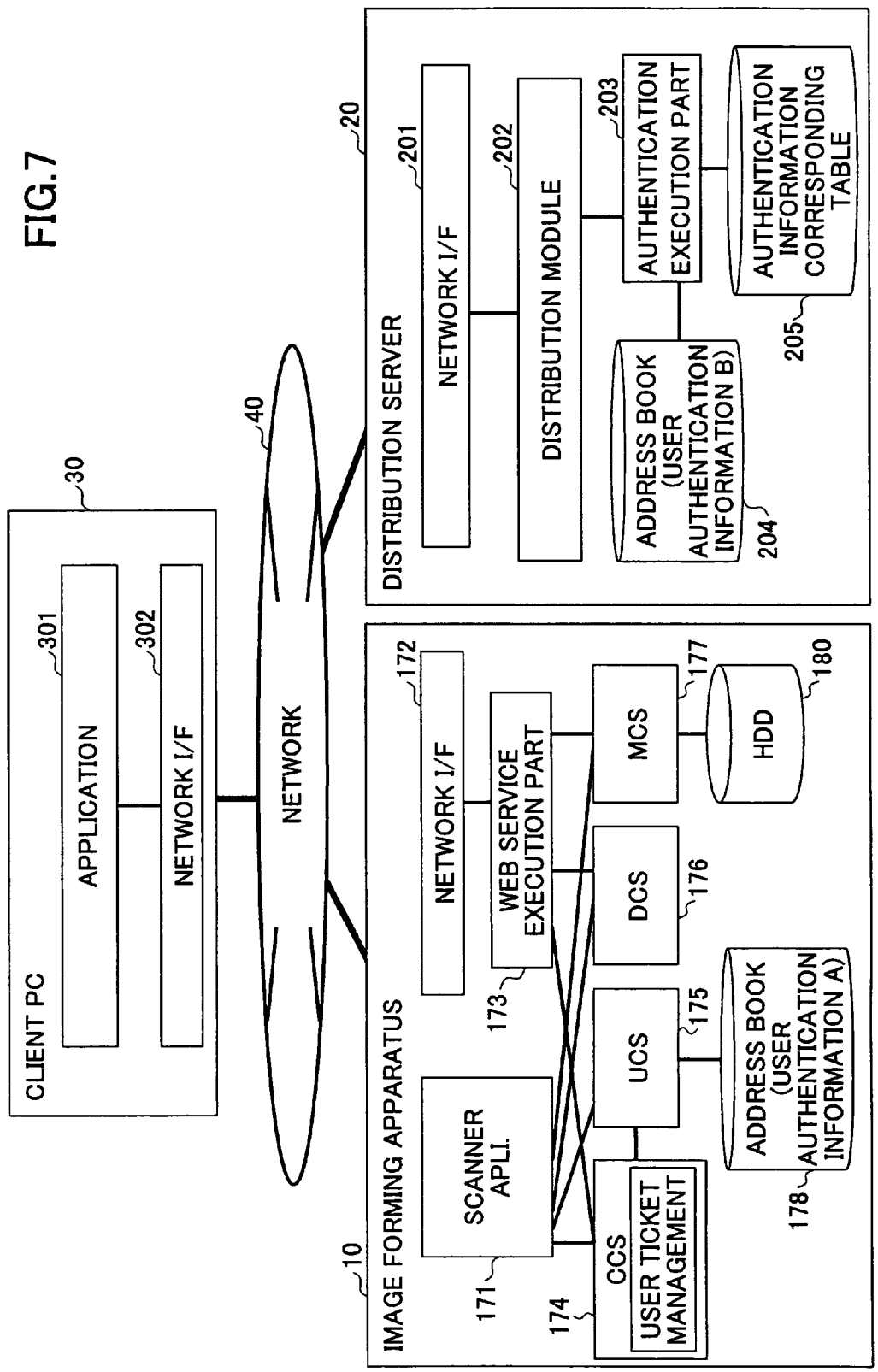
FIG. 7 is a block diagram of another embodiment of a system for realizing a user authentication method of the present invention.

FIG. 7 is a block diagram of another embodiment of a system for realizing the user authentication method of the present invention. The system shown in FIG. 7 is an example in which the image forming apparatus 10 does not store the authentication information corresponding table but the distribution server 20 has the authentication information corresponding table 205. Except for several parts, the shown in FIG. 7 is the same as the system shown in FIG. 6, and the same reference numerals are assigned to the corresponding components.

Figure 8:
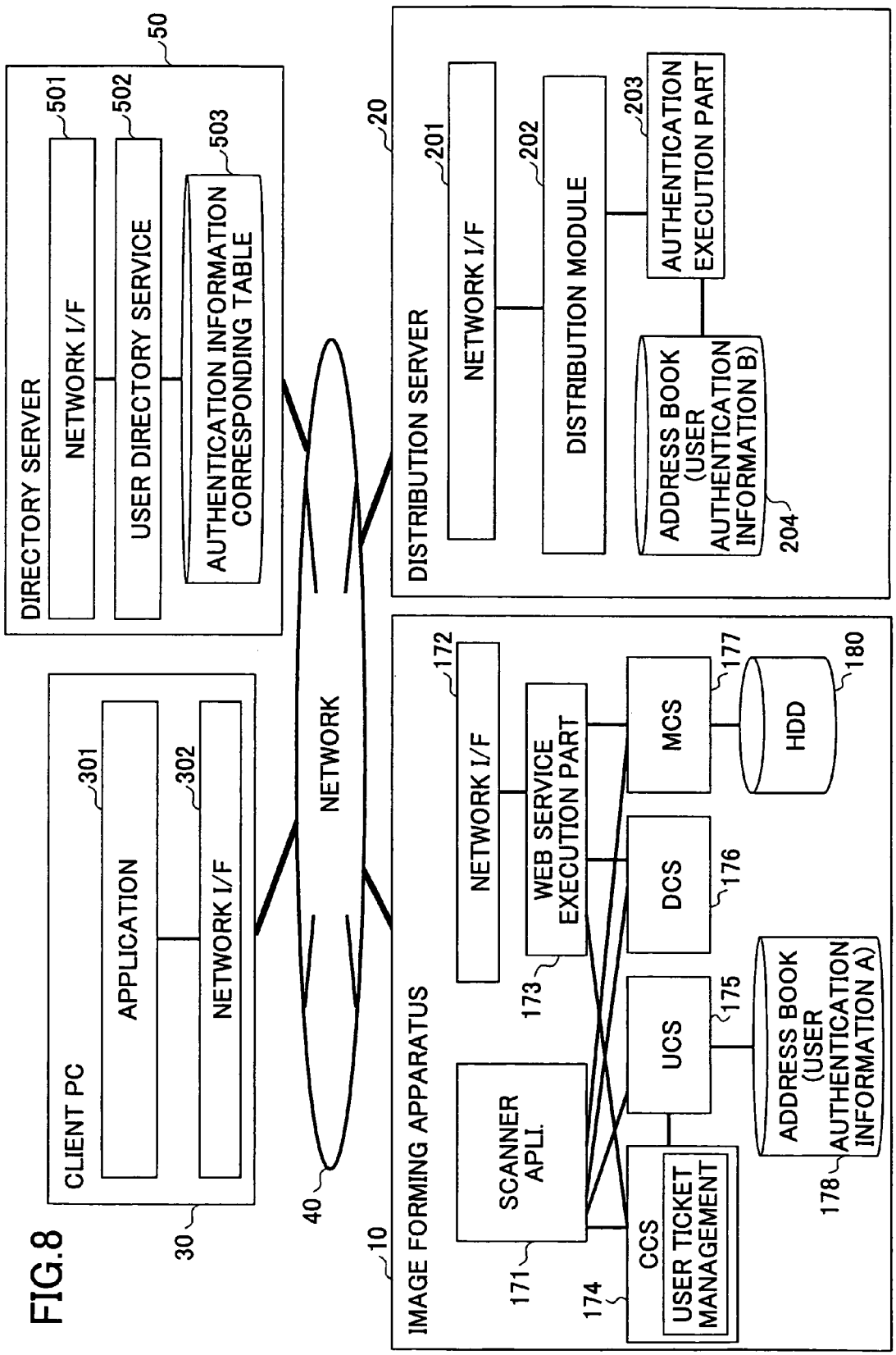
FIG. 8 is a block diagram of another embodiment of a system for realizing a user authentication method of the present invention.

FIG. 8 is a block diagram of another embodiment of a system for realizing the user authentication method of the present invention. The system shown in FIG. 8 is an example in which the authentication information corresponding table 503 is stored in the directory server 50. The system of FIG. 8 includes the image forming apparatus 10, the distribution server 20, the client PC 30 and the directory server 50 that are connected via the network 40.

In the system shown in FIG. 8, the image forming apparatus 10 does not store the authentication information corresponding table but the directory server 50 has the authentication information corresponding table 503. Except for several parts, the shown in FIG. 8 is the same as the system shown in FIG. 6, and the same reference numerals are assigned to the corresponding components.

Figure 9:
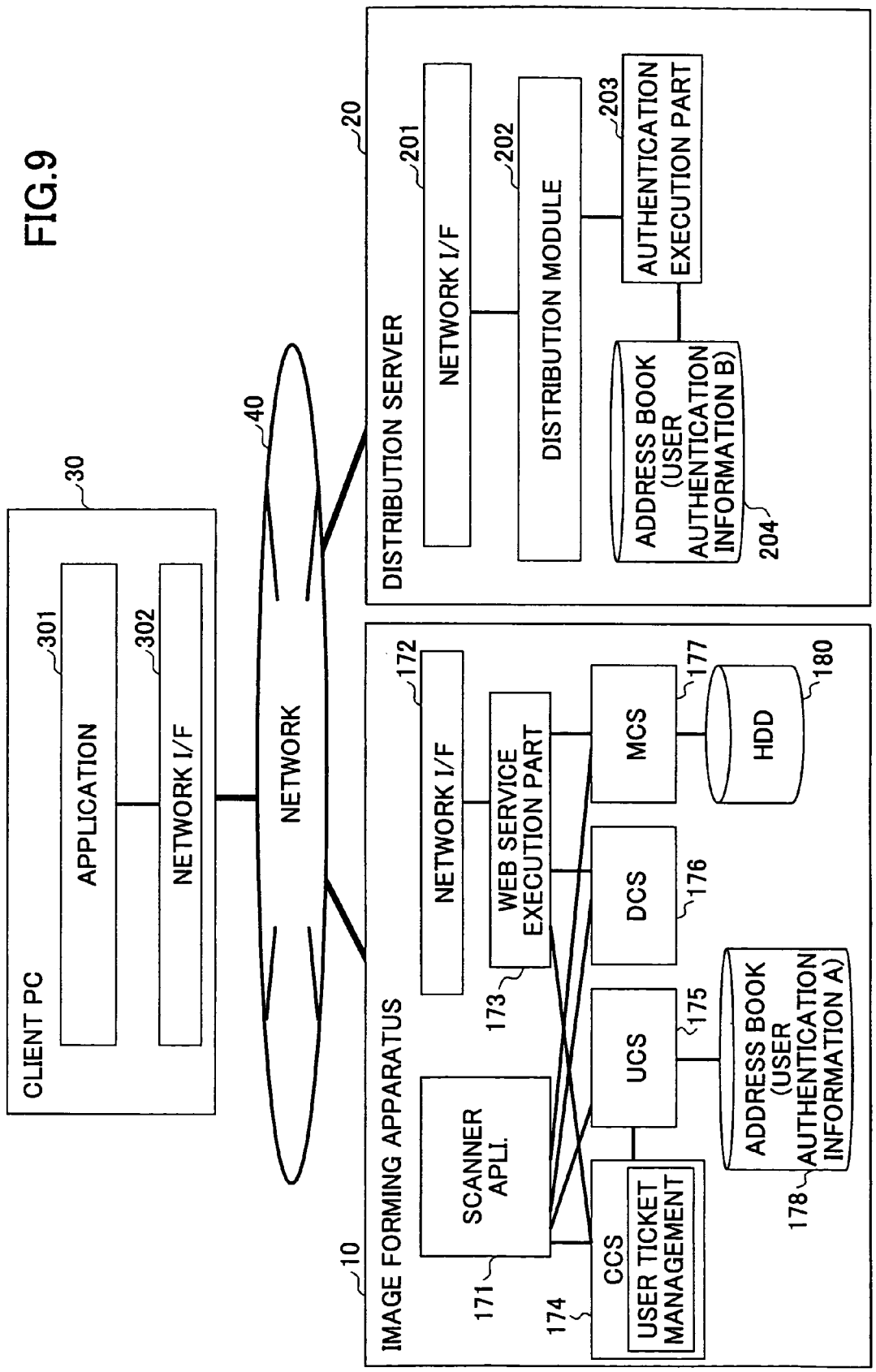
FIG. 9 is a block diagram of another embodiment of a system for realizing a user authentication method of the present invention.

FIG. 9 is a block diagram of another embodiment of a system for realizing the user authentication method of the present invention. The system shown in FIG. 9 is an example in which the authentication information corresponding table is not provided and an address book common for the image forming apparatus 10 and the distribution server 20 is used. In the system of FIG. 9, the address book 178 of the image forming apparatus 10 is synchronized with the address book 204 of the distribution server 20 so that the authentication information [A] of the image forming apparatus 10 becomes the same as the authentication information [B] of the distribution server 20. Except for several parts, the system shown in FIG. 9 is the same as the system shown in FIG. 6, and the same reference numerals are assigned to the corresponding components.

In each of the systems shown in FIGS. 6-9, the image forming apparatus 10, the distribution server 20, the client PC 30 and the directory server 50 can perform data communication via the network I/F (172, 201, 302, and 501).

Figure 10:
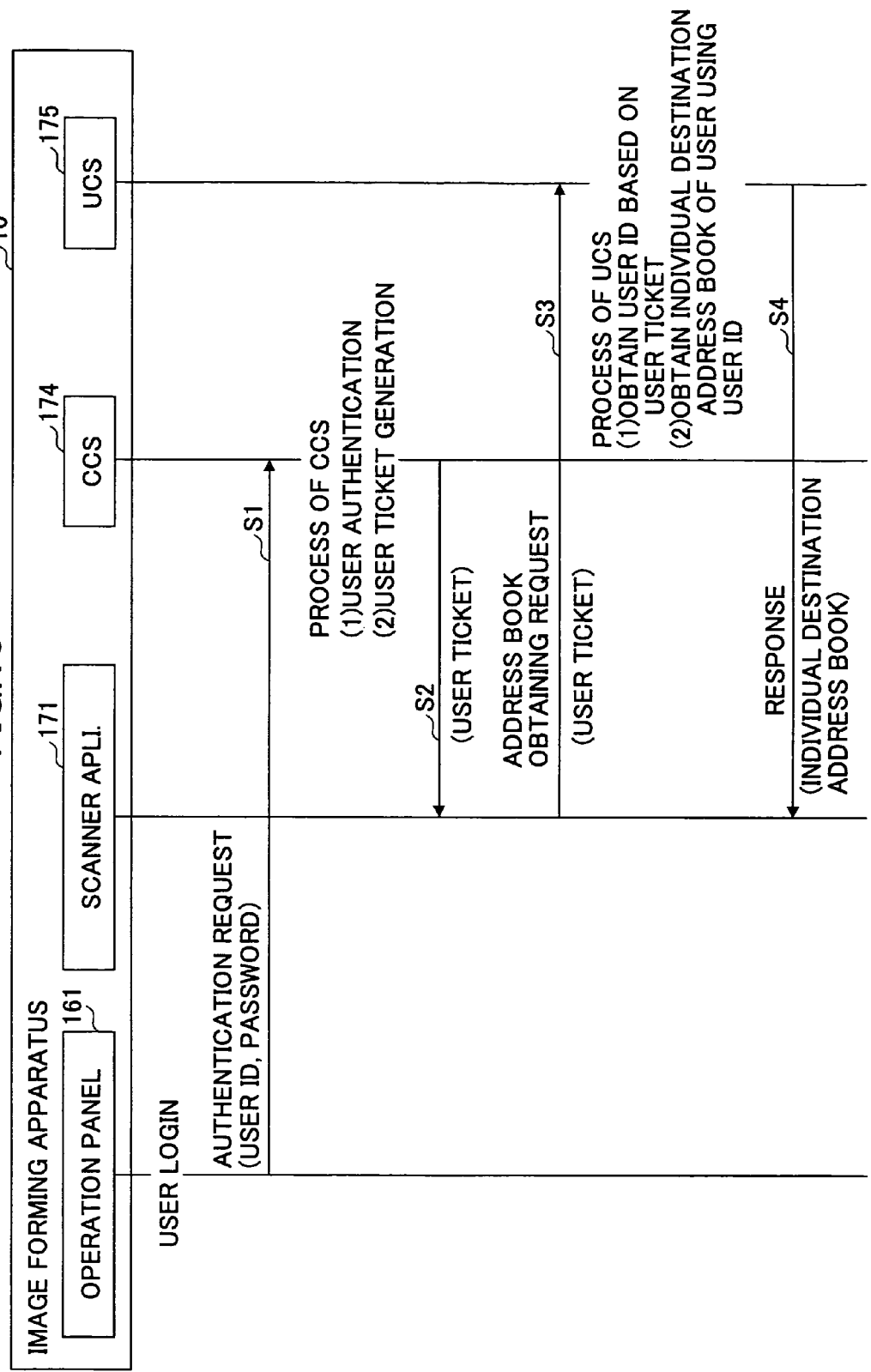
FIG. 10 is a sequence diagram representing processes from user login to obtaining an address book.

In the following, operations of the systems shown in FIGS. 6-9 are described using sequence diagrams. FIG. 10 is a sequence diagram representing processes from user login to obtaining address book. When a user of the image forming apparatus 10 performs user login by inputting a user ID and a password from the operation panel 161, an authentication request including the user ID and the password is sent from the operation panel 161 to the CCS 174 in step S1.

The CCS 174 performs user authentication using the user ID and the password included in the authentication request. Then, if the authentication is successfully completed, the CCS 174 generates a user ticket. The CCS 174 manages the generated user ticket. In step S2, the CCS 174 sends the user ticket to the scanner application 171.

When the scanner application 171 receives the user ticket, the scanner application 171 sends an address book obtaining request including the user ticket to the UCS 175 in step S3. The UCS 175 obtains the user ID from the user ticket included in the address book obtaining request. The UCS 175 obtains an individual destination address book of the user from the address book 178.

In step S4, the UCS 175 sends the obtained individual destination address book to the scanner application 171. Accordingly, the scanner application 171 can obtain the individual destination address book of the authenticated user.

Figure 11:
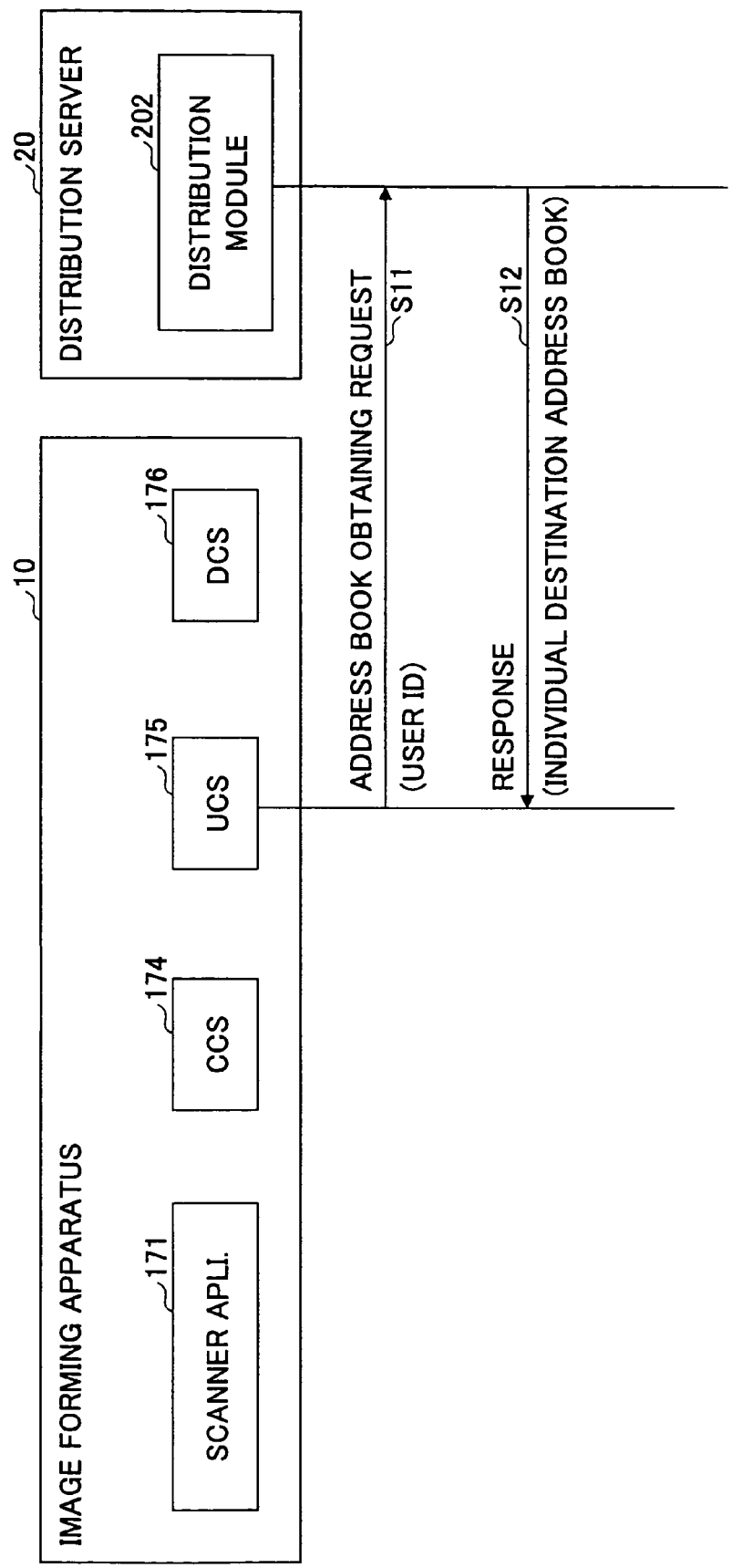
FIG. 11 is a sequence diagram representing processes for obtaining the address book from the distribution server.

The UCS 175 may obtain the individual destination address book of the user from the distribution server 20 based on a sequence shown in FIG. 11.

In step S11, the UCS 175 sends an address book obtaining request including the obtained user ID to a distribution module 202 of the distribution server 20. The distribution module 202 of the distribution server 20 obtains the individual destination address book of the user from the address book 204 using the user ID included in the address book obtaining request.

In step S12, the distribution module 202 sends the obtained individual destination address book to the UCS 175 of the image forming apparatus 10. Accordingly, the UCS 175 can obtain the individual destination address book of the user.

Figure 12:
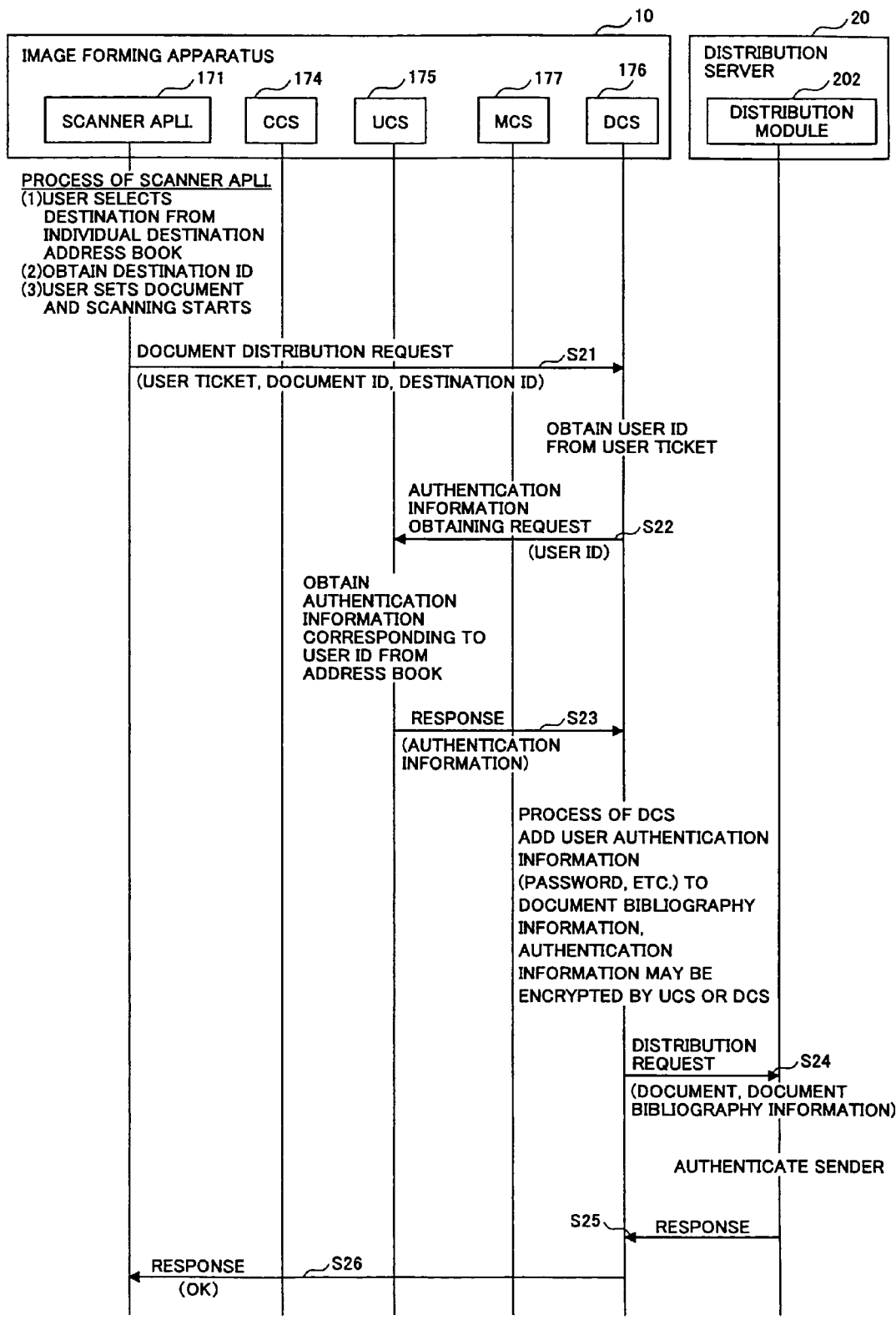
FIG. 12 is a sequence diagram representing processes from document generation to document distribution.

FIG. 12 is a sequence diagram of an example of operations from document generation to document distribution. When the user of the image forming apparatus 10 selects and designates a destination to which a document is to be distributed from the individual destination address book displayed on the operation panel 161, the scanner application 171 obtains a destination ID of the selected destination. The user sets the document to be distributed and starts scanning using the scanner function of the image forming apparatus 10.

When the scanning ends, the scanner application 171 sends a document distribution request including the user ticket, the document and the destination ID to the DCS 176 in step S21. The DCS 176 obtains the user ID from the user ticket included in the document distribution request. In step S22, the DCS 176 sends an authentication information obtaining request including the obtained user ID to the UCS 175. The UCS 175 obtains authentication information (password, for example) corresponding to the user ID as described later using the user ID included in the authentication information obtaining request. In step S23, the UCS 175 sends the authentication information to the DCS 176.

The DCS 176 adds the received authentication information to document bibliography information. The document bibliography information includes authentication information of a sender, a sender name, destination, a designated time, an image file name, an image format, and an image compression scheme. The UCS 175 or the DCS 176 may encrypt the authentication information.

In step S24, the DCS 176 sends a distribution request including the document bibliography information to the distribution module 202 of the distribution server 20 corresponding to the destination ID included in the document distribution request of step S21.

The distribution module 202 of the distribution server 20 obtains authentication information from the document bibliography information included in the distribution request, and performs user authentication using the authentication information. When the authentication information is encrypted, the distribution module 202 decrypts the authentication information before performing the user authentication. When the authentication successfully ends, the distribution module 202 sends a response in response to the distribution request of step S24 to the DCS 176 of the image forming apparatus 10 in step S25. In step S26, the DCS 176 sends a response for the document distribution request of step S21 to the scanner application 171. Accordingly, the image forming apparatus 10 can obtain authentication information for using the distribution server 20.

Figure 13:
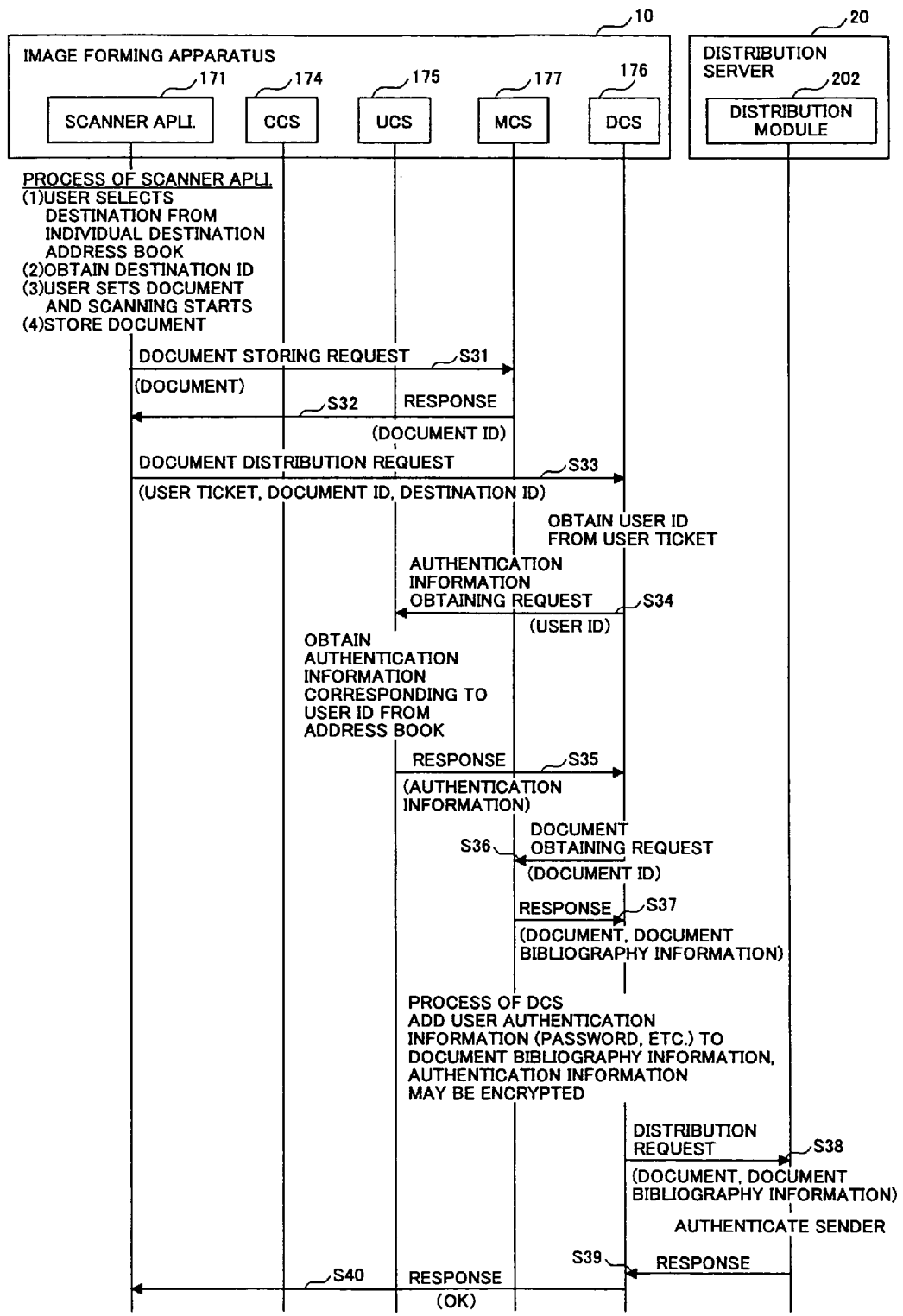
FIG. 13 is another sequence diagram representing processes from document generation to document distribution.

FIG. 13 shows a sequence diagram of another example of operations from document generation to document distribution. When the user operating the image forming apparatus 10 selects and designates a destination to which the document is to be distributed from the individual destination address book displayed on the operation panel 161, the scanner application 171 obtains the destination ID of the selected destination. Then, the user sets the document to be distributed, and starts scanning using the scanner function of the image forming apparatus 10.

When the scanning ends, the user instructs the image forming apparatus 10 to store the document from the operation panel 161. When it is designated to store the document by the user, the scanner application 171 sends a document storing request including the document to the MCS 177 in step S31. The MCS 177 obtains the document included in the document storing request and stores it to the HDD 180. The MCS 177 issues a document ID of the document stored in the HDD 180. In step S32, the MCS 177 sends the issued document ID to the scanner application 171.

In step S33, the scanner application 171 sends a document distribution request including the user ticket, the document ID and the destination ID to the DCS 176. The DCS 176 obtains the user ID from the user ticket included in the document distribution request. In step S34, the DCS 176 sends an authentication information obtaining request including the obtained user ID to the UCS 175. The UCS 175 uses the user ID included in the authentication information obtaining request to obtain the authentication information corresponding to the user ID as described later. In step S35, the UCS 175 sends the obtained authentication information to the DCS 176.

In step S36, the DCS 176 obtains the document ID from the user ticket included in the document distribution request. The DCS 176 sends a document obtaining request including the obtained document ID to the MCS 177. The MCS 177 uses the document ID included in the document obtaining request to obtain the document and the document bibliography information corresponding to the document ID from the HDD 180. In step S37, the MCS 177 sends the obtained document and the document bibliography information to the DCS 176.

The DCS 176 adds the received authentication information to the document bibliography information. The DCS 176 may encrypt the authentication information. In step S38, the DCS 176 sends a distribution request including the document and the document bibliography information to the distribution module 202 of the distribution server 20 corresponding to the destination ID included in the document distribution request of the step S33.

The distribution module 202 of the distribution server 20 obtains the authentication information from the document bibliography information included in the distribution request, and performs user authentication using the authentication information. When the authentication information is encrypted, the distribution module 202 decrypts the authentication information before performing user authentication. When the authentication successfully ends, the distribution module 202 sends a response for the distribution request of the step S38 to the DCS 176 of the image forming apparatus 10 in step S39. In step S40, the DCS 176 sends a response for the document distribution request of the step S33 to the scanner application 171. Accordingly, the image forming apparatus 10 can obtain the authentication information for using the distribution server 20.

In FIG. 12 or FIG. 13, the authentication information sent from the image forming apparatus 10 to the distribution server 20 for performing user authentication of the sender in the distribution server varies among systems shown in FIGS. 6-9. That is, the authentication information varies according to the location where the authentication information corresponding table is managed.

FIG. 14 is a figure indicating authentication information for each case for explaining differences of the authentication information for each case. When the image forming apparatus 10 has the authentication information corresponding table 179 like the system of FIG. 6, the UCS 175 obtains the authentication information [B] of the distribution server 20 from the authentication information corresponding table 179 based on the user ID of the user authenticated by the image forming apparatus 10. Therefore, the authentication information sent from the image forming apparatus 10 to the distribution server 20 is the authentication information [B] of the distribution server 20.

FIG. 24 shows an example of the authentication information corresponding table managed in the image forming apparatus. FIG. 25 shows another example of the authentication information corresponding table managed in the image forming apparatus. In the authentication information corresponding table 179 shown in FIG. 24, pieces of authentication information of the image forming apparatus 10, the distribution server 20 and the workflow server 21 are associated with each other for each user ID common for all apparatuses. In the authentication information corresponding table 179 shown in FIG. 24, a password is used as the authentication information. The password is information for checking the user. In the authentication information corresponding table 179 shown in FIG. 25, pieces of authentication information of the image forming apparatus 10, the distribution server 20 and the workflow server 21 are associated with each other for each user ID common for all apparatuses. In the authentication information corresponding table 179 shown in FIG. 24, ID and the password are used as the authentication information. The user ID is information for identifying a user among apparatuses. The ID is information for identifying a user in each apparatus.

In addition, like the system shown in FIG. 7, when the distribution server 20 has the authentication information corresponding table 205, the authentication execution part 203 obtains the authentication information [B] of the distribution server 20 from the authentication information corresponding table 205 based on the user ID of the user authenticated by the image forming apparatus 10. Therefore, the authentication information sent from the image forming apparatus 10 to the distribution server 20 is the authentication information [A] of the image forming apparatus 10.

In this case, the authentication information [A] includes the user ID of the user authenticated by the image forming apparatus 10. For example, the distribution server 20 may receive, in addition to the user ID, a digital signature proving that an apparatus that authenticates the user is a trusted apparatus so as to be able to authenticate the apparatus that sent the distribution request is a trusted apparatus. The digital signature is information for checking the apparatus that authenticated the user.

A public key for checking the digital signature is managed by the apparatus authentication information corresponding table 183 shown in FIG. 26 for each apparatus. FIG. 26 shows an example of the apparatus authentication information corresponding table managed in the distribution server. The image forming apparatus 10 sends the digital signature generated by a secret key of the image forming apparatus 10 to the distribution server 20. The distribution server 20 decrypts the digital signature by using the public key of the image forming apparatus 10 managed by the apparatus authentication corresponding table 206 so as to check whether the apparatus that sent the distribution request is a trusted apparatus.

In addition, like the system shown in FIG. 8, when the directory server 50 has the authentication information corresponding table 503, the user directory service 502 of the directory server 50 obtains the authentication information [B] of the distribution server 20 from the authentication information corresponding table 503 based on the user ID of the user authenticated by the image forming apparatus 10, and sends the authentication information [B] to the image forming apparatus 10.

Therefore, the authentication information sent from the image forming apparatus 10 to the distribution server 20 becomes the authentication information [B] of the distribution server 20. Alternatively, the user directory service 502 of the directory server 50 may obtain the authentication information [B] of the distribution server 20 from the authentication information corresponding table 503 to send the authentication information [B] to the distribution server 20.

In addition, like the system of FIG. 9, when the image forming apparatus 10 and the distribution server 20 uses a common address book, since the authentication information [A] of the image forming apparatus 10 and the authentication information [B] of the distribution server 20 are the same, the distribution server 20 can use the authentication information [A] as it is. Therefore, the authentication information sent from the image forming apparatus 10 to the distribution server 20 becomes the authentication information [A] of the image forming apparatus 10.

Examples in which the user operates the image forming apparatus 10 are described so far. Alternatively, the image forming apparatus 10 can be operated remotely from the client PC 30. In the following, processes of the systems shown in FIGS. 6-9 in the case where the image forming apparatus 10 and the distribution server 20 are remotely operated from the client PC 30 are described with reference to sequence diagrams. FIG. 15 is a sequence diagram showing processes from session start to obtaining address book. In this embodiment, an example in which the image forming apparatus 10 does not perform distribution from the DCS 176 but the distribution service performs distribution.

First, the user operating the client PC 30 inputs the user ID and the password into the client PC 30. When the client PC 30 receives the user ID and the password, the application 301 of the client PC 30 sends a session start request including the user ID and the password to the distribution service 181 of the image forming apparatus 10 in step S51. The distribution service 181 is an example of Web services.

In step S52, the distribution service 181 obtains the user ID and the password included in the session start request, and sends an authentication request including the user ID and the password to the CCS 174. The CCS 174 performs user authentication using the user ID and the password included in the authentication request. Then, the CCS 174 generates a user ticket when the authentication successfully ends. The CCS 174 manages the generated user ticket. In step S53, the CCS 174 sends the user ticket to the distribution service 181.

When the distribution service 181 receives the user ticket, the distribution service 181 issues a session ID based on the user ticket. In step S54, the distribution service 181 sends the issued session ID to the application 301 of the client PC 30. In step S55, the application 301 sends an address book obtaining request including the received session ID to the distribution module 202 of the distribution server 20. The distribution module 202 of the distribution server 20 uses the user ID included in the address book obtaining request to obtain the individual destination address book of the user from the address book 204.

In step S56, the distribution module 202 sends the obtained individual destination address book to the application 301 of the client PC 30. Accordingly, the client PC 30 can obtain the individual destination address book of the user from the distribution server 20.

Figure 16:
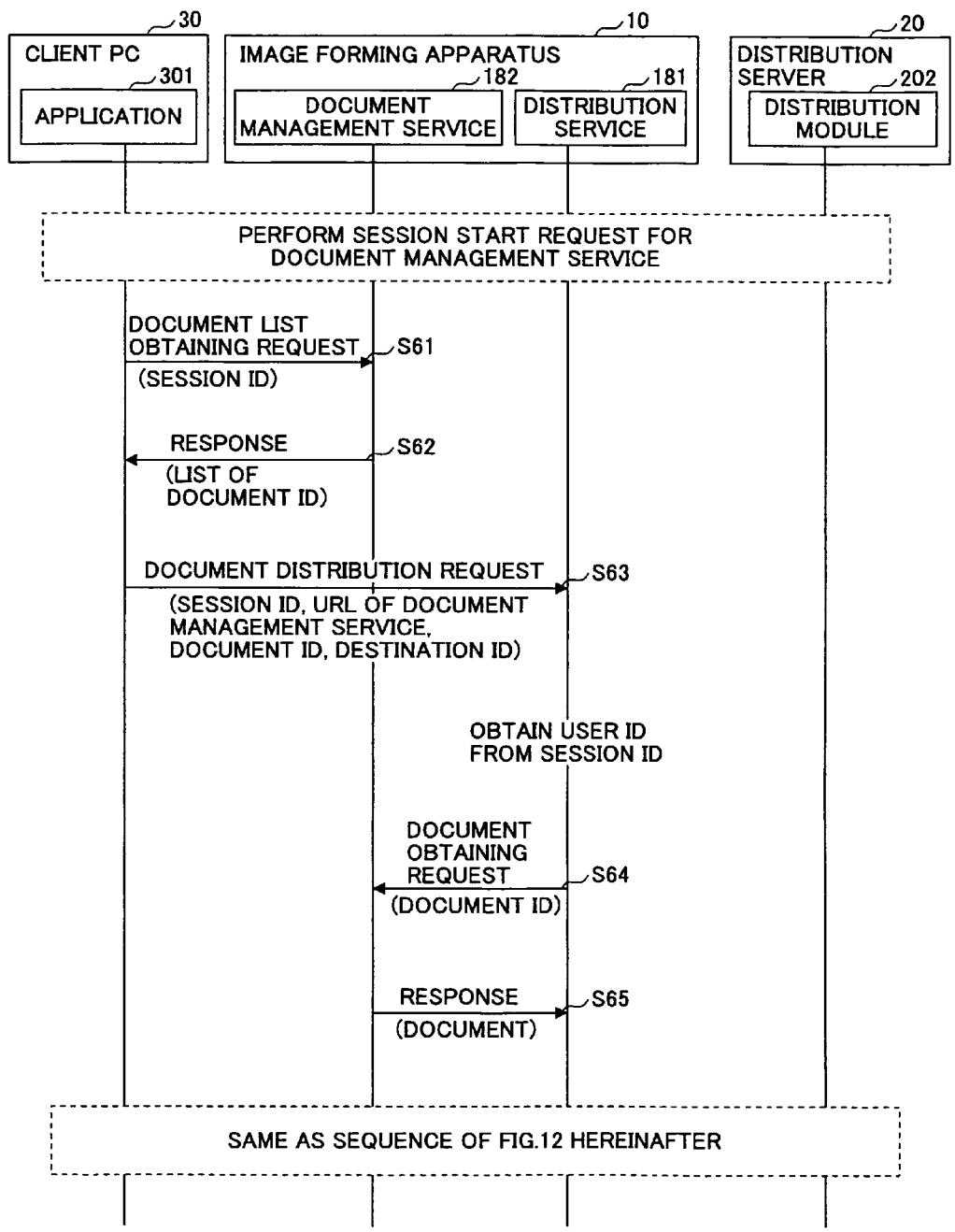
FIG. 16 is a sequence showing processes from document selection to document distribution.

FIG. 16 is a sequence diagram of an example of operation from document selection to document distribution. Like the steps S51-S54 in FIG. 15, the application 301 of the client PC 30 sends a session start request to the document management service 182 of the image forming apparatus 10 to obtain a session ID.

Moving to the step S61, the application 301 sends the document list obtaining request including the received session ID to the document management service 182 of the image forming apparatus. In step S62, the document management service 182 of the image forming apparatus 10 uses the session ID included in the document list obtaining request to send a list of document ID to the application 301 of the client PC 30.

The user of the client PC 30 selects and designates a document to be distributed from the list of documents displayed on a display. In addition, the user selects a destination to which the document is distributed from the displayed individual destination address book. The application 301 obtains the document ID of the selected document and the destination ID of the destination.

In step S63, the application 301 sends a document distribution request including the session ID, a URL of the distribution management service, the document ID and the destination ID to the distribution service 181 of the image forming apparatus 10. The distribution service 181 uses the session ID included in the document distribution request to obtain the user ID corresponding to the session ID.

In step S64, the distribution service 181 obtains the document ID included in the document distribution request. The distribution service 181 sends a document obtaining request including the obtained document ID to the document management service 182. The document management service 182 uses the document ID included in the document obtaining request to obtain a document corresponding to the document ID from the HDD 180. In step S65, the document management service 182 sends the obtained document to the distribution service 181.

After that, like the steps S24-S26 in FIG. 12, the document management service 182 sends a distribution request including the document and the document bibliography information to the distribution module 202 of the distribution server 20 corresponding to the destination ID included in the document distribution request in step S63.

The distribution module 202 of the distribution server 20 obtains authentication information from the document bibliography information included in the distribution request to perform user authentication using the authentication information. When the authentication information is encrypted, the distribution module 202 performs user authentication after decrypting the authentication information. When the authentication successfully ends, the distribution module 202 sends a response for the distribution request to the distribution service 181 of the image forming apparatus 10. The distribution service 181 sends a response for the document distribution request of step S63 to the application 301 of the client PC 30. Accordingly, based on remote operations from the client PC 30, the image forming apparatus 10 can obtain authentication information for using the distribution server 20.

Figure 17:
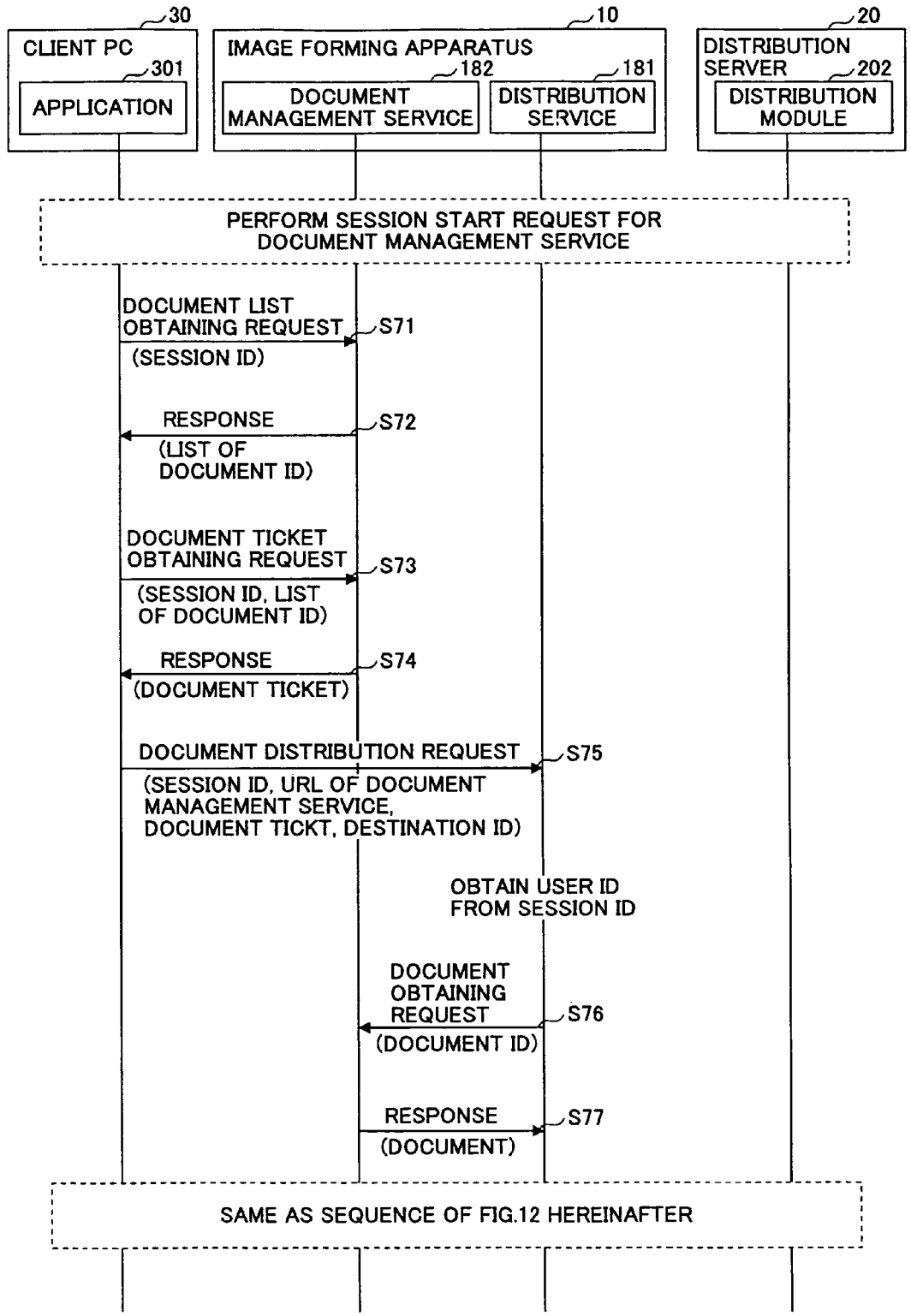
FIG. 17 is another sequence showing processes from document selection to document distribution.

FIG. 17 is a sequence diagram showing another example of the operation from document selection to document distribution. Like the steps S51-S54 in FIG. 15, the application 301 of the client PC 30 sends a session start request to the document management service 182 of the image forming apparatus 10 to obtain a session ID.

In step S71, the application 301 sends a document list obtaining request including the received session ID to the document management service 182 of the image forming apparatus 10. In step S72, the document management service 182 of the image forming apparatus 10 uses the session ID included in the document list obtaining request to send a list of document ID to the application 301 of the client PC 30.

The user operating the client PC 30 selects and designates a document to be distributed from the list of documents displayed on a display. The application 301 obtains the document ID of the selected document. In step S73, the application 301 sends a document ticket obtaining request including the session ID and a list of document ID of selected document to the document management service 182 of the image forming apparatus 10. The document management service 182 generates a document ticket using the session ID and the list of the document ID included in the document ticket obtaining request. The document management service 182 manages the document ticket. In step S74, the document management service 182 sends the document ticket to the application 301 of the client PC 30.

The user operating the client PC 30 selects and designates a destination to which the document is distributed from the individual destination address book displayed on the display. The application 301 obtains the destination ID of the selected destination.

In step S75, the application 301 sends a document distribution request including the session ID, a URL of the document management service, the document ticket and the destination ID to the distribution service 181 of the image forming apparatus 10. The distribution service 181 uses the session ID included in the document distribution request to obtain the user ID corresponding to the session ID.

In step S76, the distribution service 181 obtains the document ticket included in the document distribution request. The distribution service 181 sends a document obtaining request including the obtained document ticket to the document management service 182. The document management service 182 uses the document ticket included in the document obtaining request to obtain a document corresponding to the document ticket from the HDD 180. In step S77, the document management service 182 sends the document obtained from the HDD 180 to the distribution service 181.

After that, like the steps S24-S26 in FIG. 12, the document management service 182 sends a distribution request including the document and the document bibliography information to the distribution module 202 of the distribution server 20 corresponding to the destination ID included in the document distribution request.

The distribution module 202 of the distribution server 20 obtains the authentication information from the document bibliography information included in the distribution request and performs user authentication using the authentication information. When the authentication information is encrypted, the distribution module 202 decrypts the authentication information before performing the user authentication. When the authentication successfully ends, the distribution module 202 sends a response for the distribution request to the distribution service 181 of the image forming apparatus 10. The distribution service 181 sends a response for the document distribution request of step S75 to the application 301 of the client PC 30. Accordingly, based on remote operation from the client PC 30, the image forming apparatus 10 can obtain the authentication information for using the distribution server 20.

Figure 18:
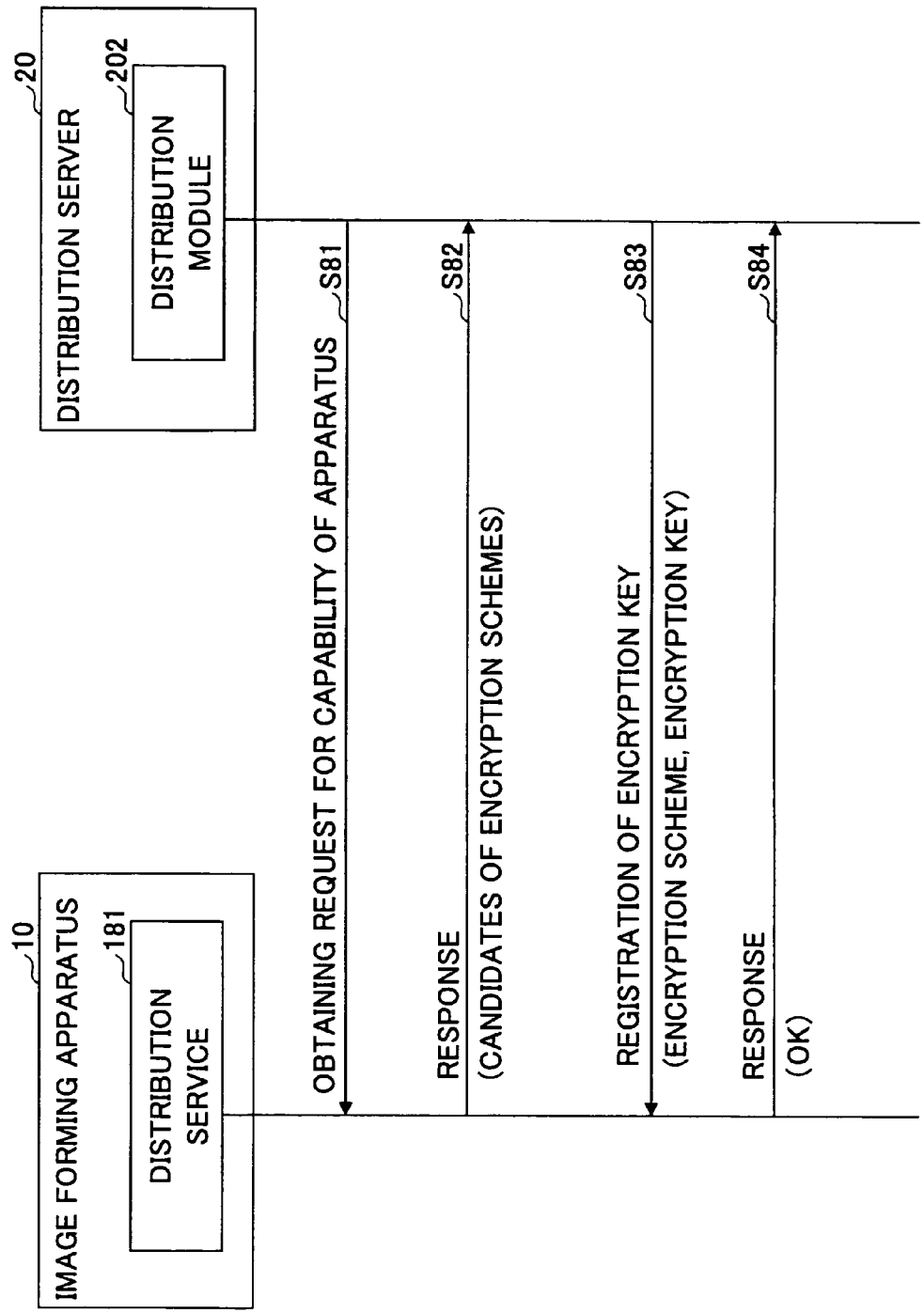
FIG. 18 is a sequence diagram indicating processes for registering an encryption key.

For encrypting the authentication information sent from the image forming apparatus 10 to the distribution server 20, it is necessary to store an encryption key of the distribution server 20 in the image forming apparatus 10 beforehand. FIG. 18 shows a sequence diagram indicating processes for registering the encryption key.

In step S81, the distribution module 202 of the distribution server 20 sends a capability obtaining request of an apparatus to the distribution service 181 of the image forming apparatus 10. In step S82, the distribution service 181 sends candidates of encryption schemes to the distribution module 202 of the distribution server 20. In step S83, the distribution module 202 selects an encryption scheme from among the candidates of encryption schemes, and sends the selected encryption scheme and an encryption key registration request including the encryption key to the distribution service 181. In step S84, the distribution service 181 reports encryption key registration OK to the distribution module 202 of the distribution server 20. In step S81, an apparatus management service may obtain the capability of apparatus.

Next, a synchronization process of the address book is described. FIG. 27 shows a sequence diagram of the synchronization process of the address book when the authentication information corresponding table exists in the image forming apparatus or the distribution server. In the example shown in FIG. 27, a polling scheme and collective updating are adopted.

First, the UCS 175 of the image forming apparatus 10 obtains a URL of the distribution server 20 from the authentication information corresponding table 179 shown in FIG. 24 or FIG. 25. In step S100, the UCS 175 sends an authentication information obtaining request to the DCS 176 by specifying the URL of the distribution server 20. For obtaining authentication information of a particular user, the UCS 175 sends the authentication information obtaining request to the DCS 176 by specifying the user ID. The UCS 175 may collectively obtain all authentication information included in the address book 204 of the distribution server 20. At this time, it is not necessary for the UCS 175 to designate the user ID.

In step S101, the DCS 176 sends the authentication information obtaining request to the distribution module 202 of the distribution server 20 corresponding to the specified URL. The distribution module 202 obtains authentication information from the address book 204. In step S102, the distribution module 202 sends an authentication information list to the DCS 176 of the image forming apparatus 100 as a response of the authentication information obtaining request. The authentication information list is a list including pairs of a user ID and a password.

In step S103, the DCS sends the authentication information list to the UCS 175 as a response of the authentication information obtaining request in step S100. The UCS 175 can synchronize the authentication information of the address book 178 with the address book 204 of the distribution server 20.

Figure 28:
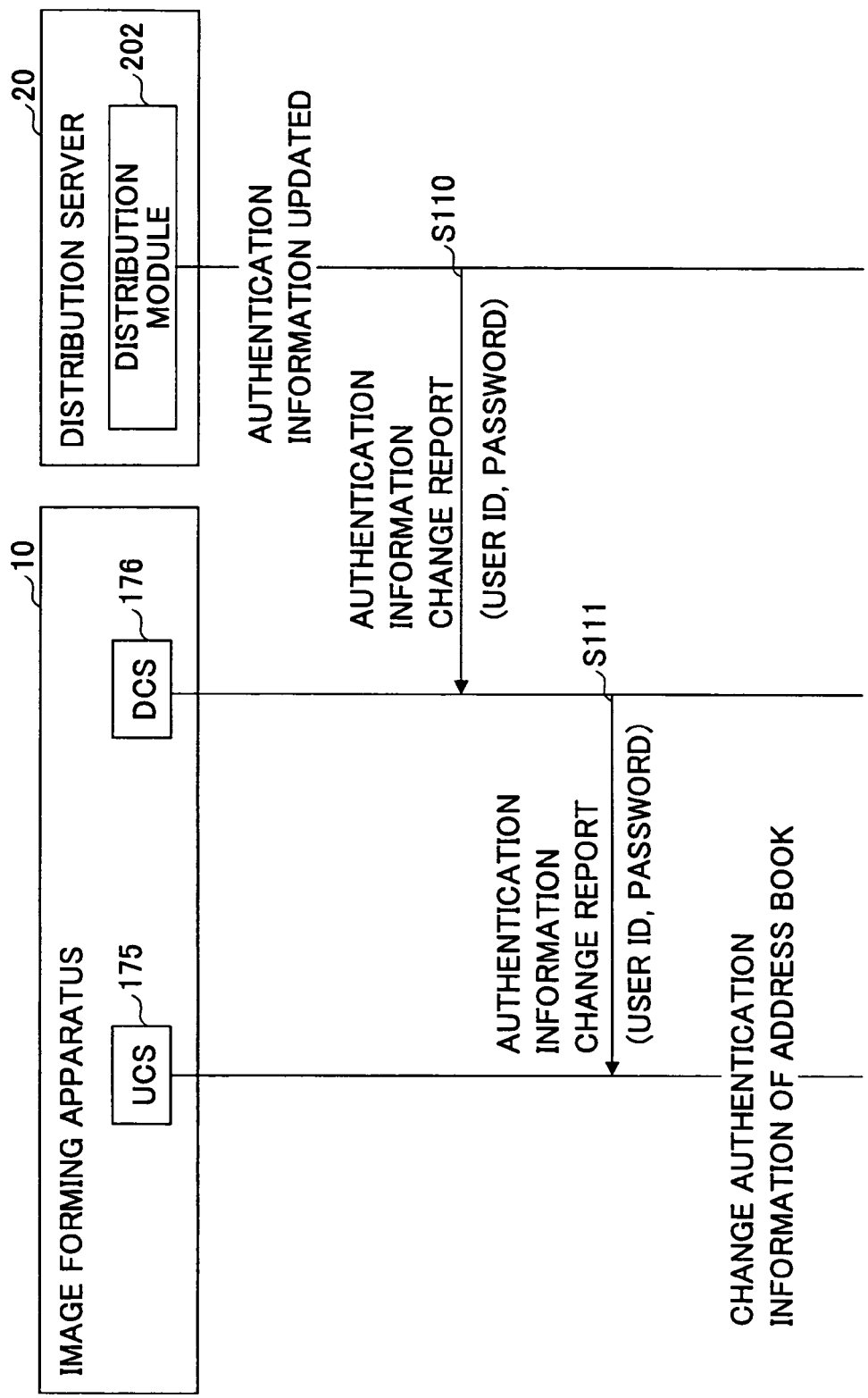
FIG. 28 is a sequence diagram representing a synchronization process of the address book.

FIG. 28 shows a sequence diagram representing synchronization process of the address book when the authentication information corresponding table exists in the image forming apparatus or the distribution server. In the example shown in FIG. 28, synchronization is performed when the address book is updated, and the user ID and the password are included in the authentication information change report from the distribution server 20.

First, the distribution module 202 of the distribution server 20 detects update of the authentication information. In step S110, the distribution module 202 of the distribution server 20 sends the authentication information change report including the user ID and the password to the DCS 176 of the image forming apparatus 10. In step S111, the DCS sends the authentication information change report including the user ID and the password to the UCS 175. The UCS 175 can synchronize the authentication information of the address book 178 with the address book 204 of the distribution server 20 using the received user ID and the password.

Figure 29:
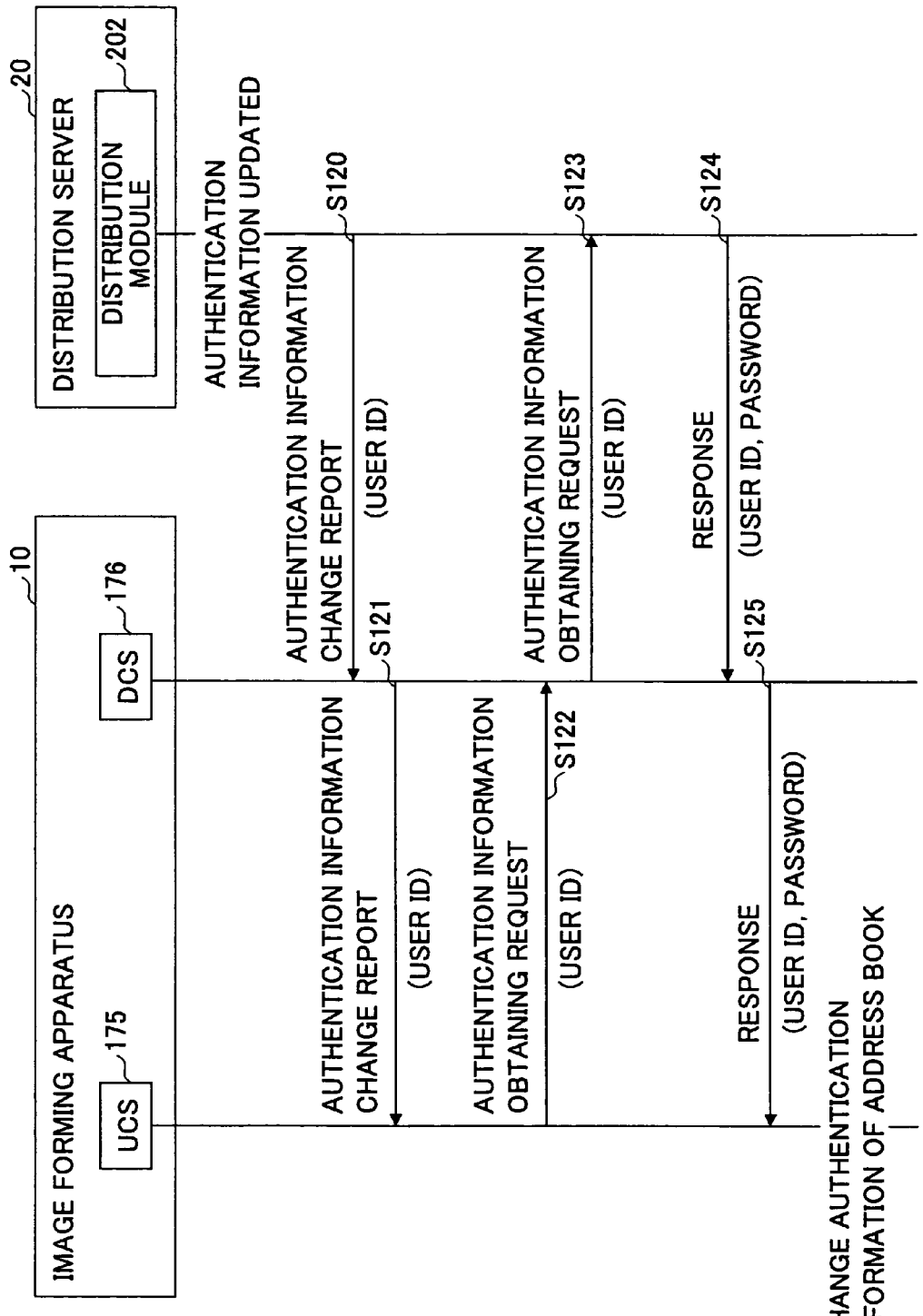
FIG. 29 is a sequence diagram representing a synchronization process of the address book.

FIG. 29 is a sequence diagram showing a synchronization process of the address book when the authentication information corresponding table exists in the image forming apparatus or the distribution server. In the example shown in FIG. 29, the synchronization is performed when the address book is updated.

In the sequence shown in FIG. 29, after the authentication information change report is sent from the distribution server 20, the image forming apparatus 10 sends the authentication information obtaining request. First, the distribution module 202 of the distribution server 20 detects update of the authentication information.

In step S120, the distribution module 202 of the distribution server 20 sends the authentication information change report specifying the user ID to the DCS 176 of the image forming apparatus 10. In step S121, the DCS 176 sends the authentication information change report specifying the user ID to the UCS 175.

In step S122, the UCS 175 sends the authentication information obtaining request specifying the user ID to the DCS 176. In step S123, the DCS 176 sends the authentication information obtaining request specifying the user ID to the distribution module 202 of the distribution server 20. The distribution module 202 obtains authentication information from the address book 204.

In step S124, the distribution module 202 sends the user ID and the password to the DCS 176 of the image forming apparatus 10 as a response of the authentication information obtaining request of the step S123. In step S125, the DCS 176 sends the user ID and the password to the UCS 175 as a response of the authentication information obtaining request in step S122. The UCS 175 can synchronize the authentication information of the address book 178 with the address book 204 of the distribution server 20 using the received user ID and the password.

Figure 30:
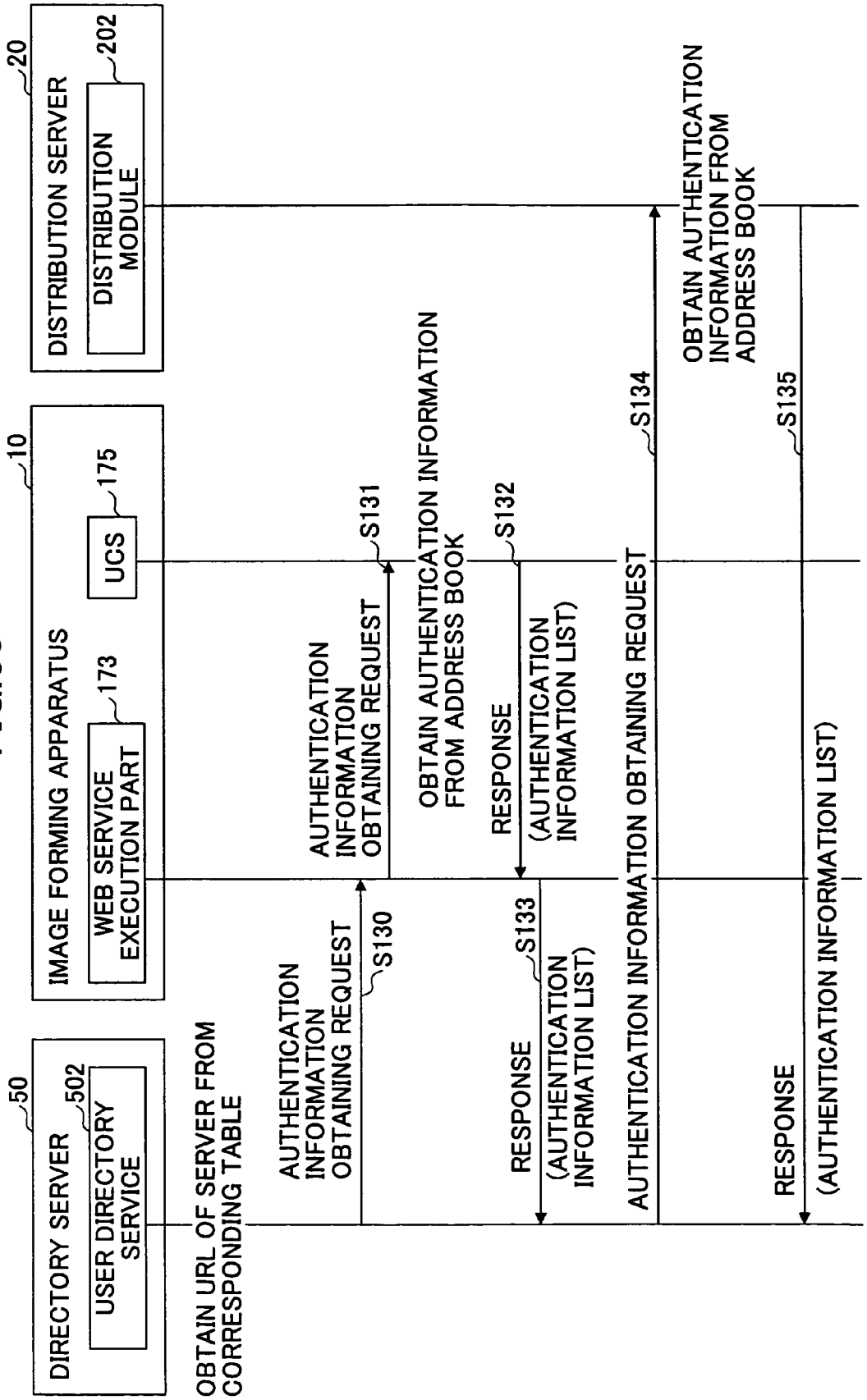
FIG. 30 is a sequence diagram representing a synchronization process of the address book.

FIG. 30 is a sequence diagram showing the synchronization process of the address book when the authentication information corresponding table exists in the directory server. The sequence shown in FIG. 30 shows a case of collective updating.

First, the user directory service 502 of the directory server 50 obtains URLs of the image forming apparatus 10 and the distribution server 20 from the authentication information corresponding table 179 shown in FIG. 24 or FIG. 25. In step S130, the user directory service 502 sends an authentication information obtaining request to the Web service execution part 173 by specifying the URL of the image forming apparatus 10.

In step S131, the Web service execution part 173 sends the authentication information obtaining request to the UCS 175. The UCS 175 obtains the authentication information from the address book 178. In step S132, the UCS 175 sends an authentication information list to the user directory service 502 of the directory server 50 as a response of the authentication information obtaining request of the step S131.

In step S134, the user directory service 502 sends the authentication information obtaining request to the distribution module 202 by specifying the URL of the distribution server 20. The distribution module 202 obtains the authentication information from the address book 204. In step S135, the distribution module 202 sends an authentication information list to the usr directory service 502 of the directory server 50 as a response of the authentication information obtaining request in step S134. The user directory service 502 of the directory server 50 can synchronize the authentication information corresponding table 503 with the address book 178 of the image forming apparatus 10 and the address book 204 of the distribution server 20 using the received authentication information list.

Second Embodiment

Figure 19:
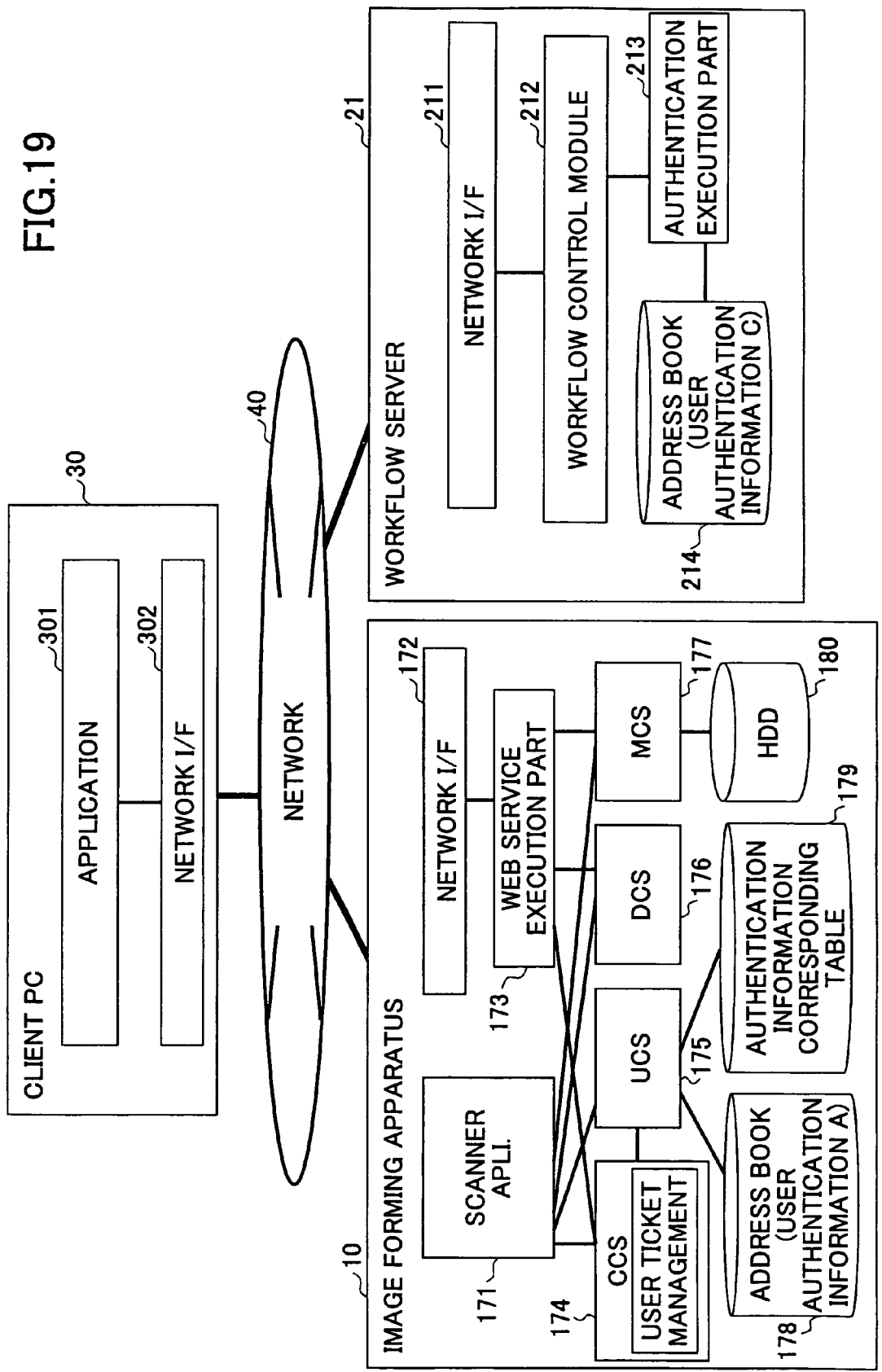
FIG. 19 is a block diagram of an embodiment of a system for realizing the user authentication method of the present invention.

FIG. 19 is a block diagram of an embodiment of the system for realizing the user authentication method of the present invention. The system of FIG. 19 shows an example in which the authentication information corresponding table is stored in the image forming apparatus 10. The system of FIG. 19 includes the image forming apparatus 10, the workflow server 21 and the client PC 30 that are connected via the network 40. In the configuration of the image forming apparatus 10, distribution server 20 and the client PC 30 shown in FIG. 19, components that are unnecessary for description are omitted.

The image forming apparatus 10 includes a scanner application 171, a network I/F 172, a Web service execution part 173, a CCS 174, a UCS 175, a DCS 176, a MCS 177, an address book 178, an authentication information corresponding table 179 and a HDD 180. The workflow server 21 includes a network I/F 211, a workflow control module 212, an authentication execution part 213 and an address book 214. The client PC 30 includes an application 301 and a network I/F 302.

Figure 20:
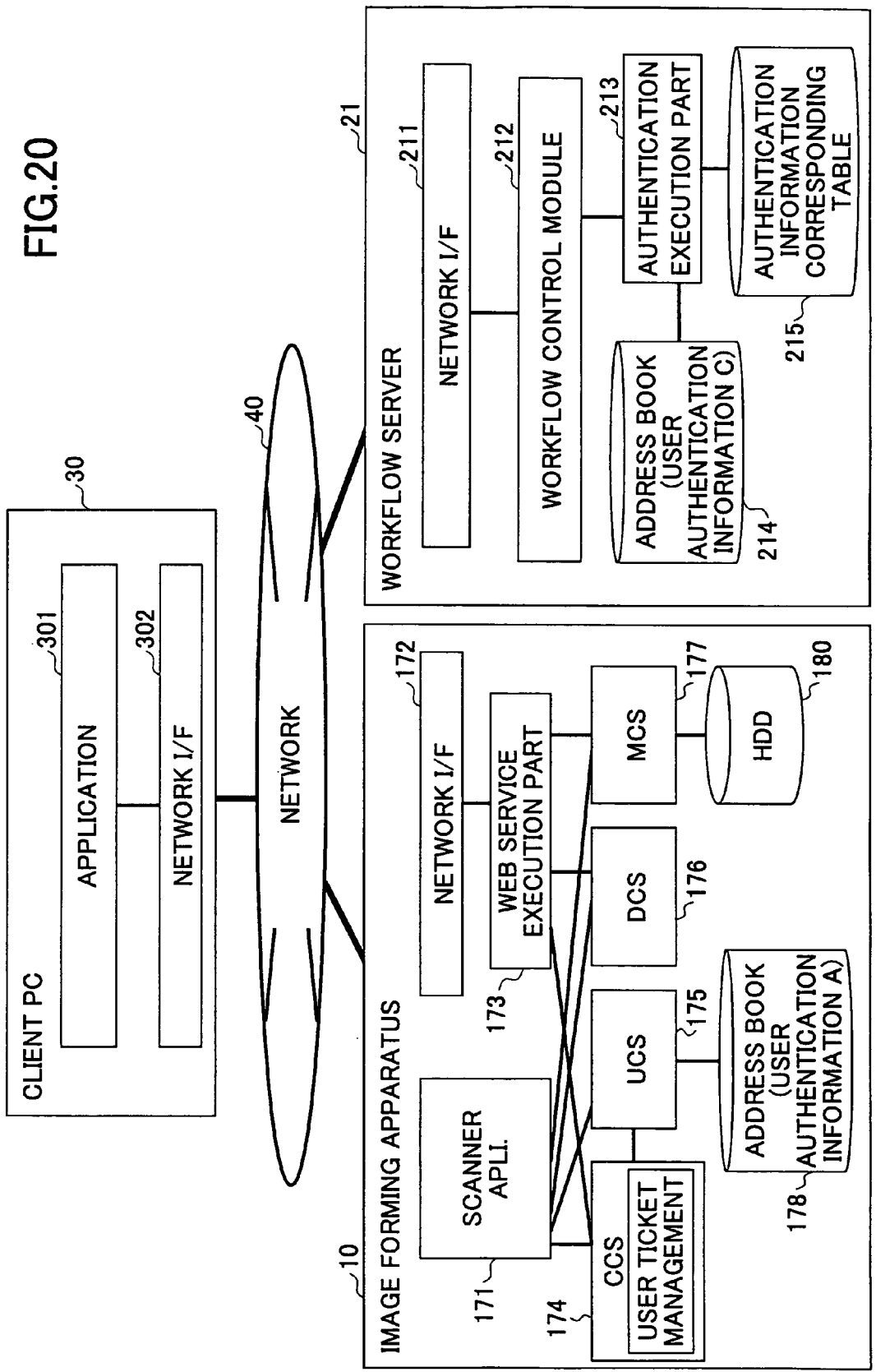
FIG. 20 is a block diagram of another embodiment of a system for realizing the user authentication method of the present invention.

FIG. 20 is a block diagram of another embodiment of a system for realizing the user authentication method of the present invention. The system shown in FIG. 20 is an example in which the image forming apparatus 10 does not store the authentication information corresponding table but the workflow server 21 has the authentication information corresponding table 215. Except for several parts, the system shown in FIG. 20 is the same as the system shown in FIG. 19, and the same reference numerals are assigned to the corresponding components.

Figure 21:
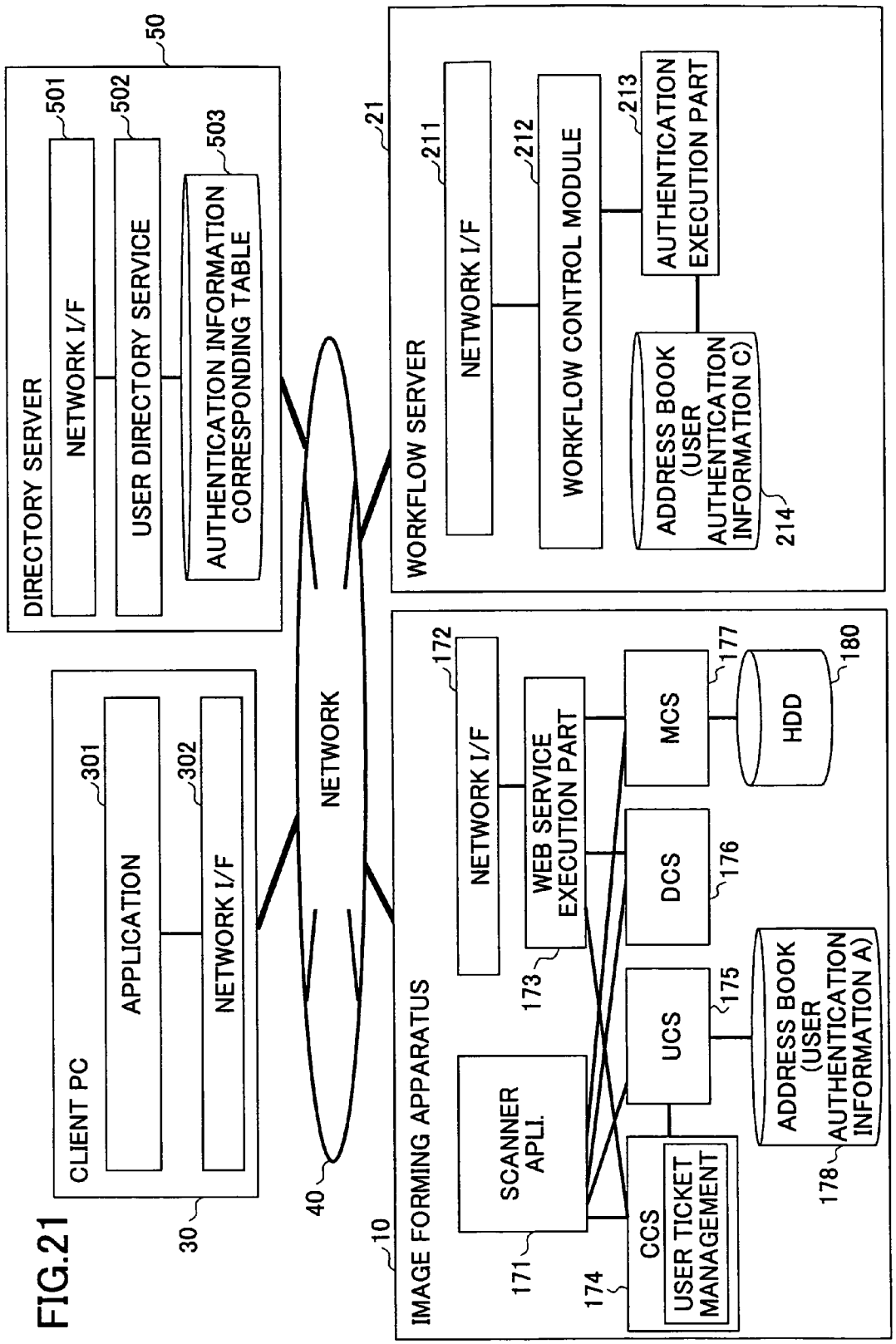
FIG. 21 is a block diagram of another embodiment of a system for realizing the user authentication method of the present invention.

FIG. 21 is a block diagram of another embodiment of a system for realizing the user authentication method of the present invention. The system shown in FIG. 21 is an example in which the authentication information corresponding table is stored in the directory server 50. The system of FIG. 21 includes the image forming apparatus 10, the workflow server 21, the client PC 30 and the directory server 50 that are connected via the network 40. In the system shown in FIG. 21, the image forming apparatus 10 does not store the authentication information corresponding table but the directory server 50 has the authentication information corresponding table 503. Except for several parts, the system shown in FIG. 21 is the same as the system shown in FIG. 19, and the same reference numerals are assigned to the corresponding components.

Figure 22:
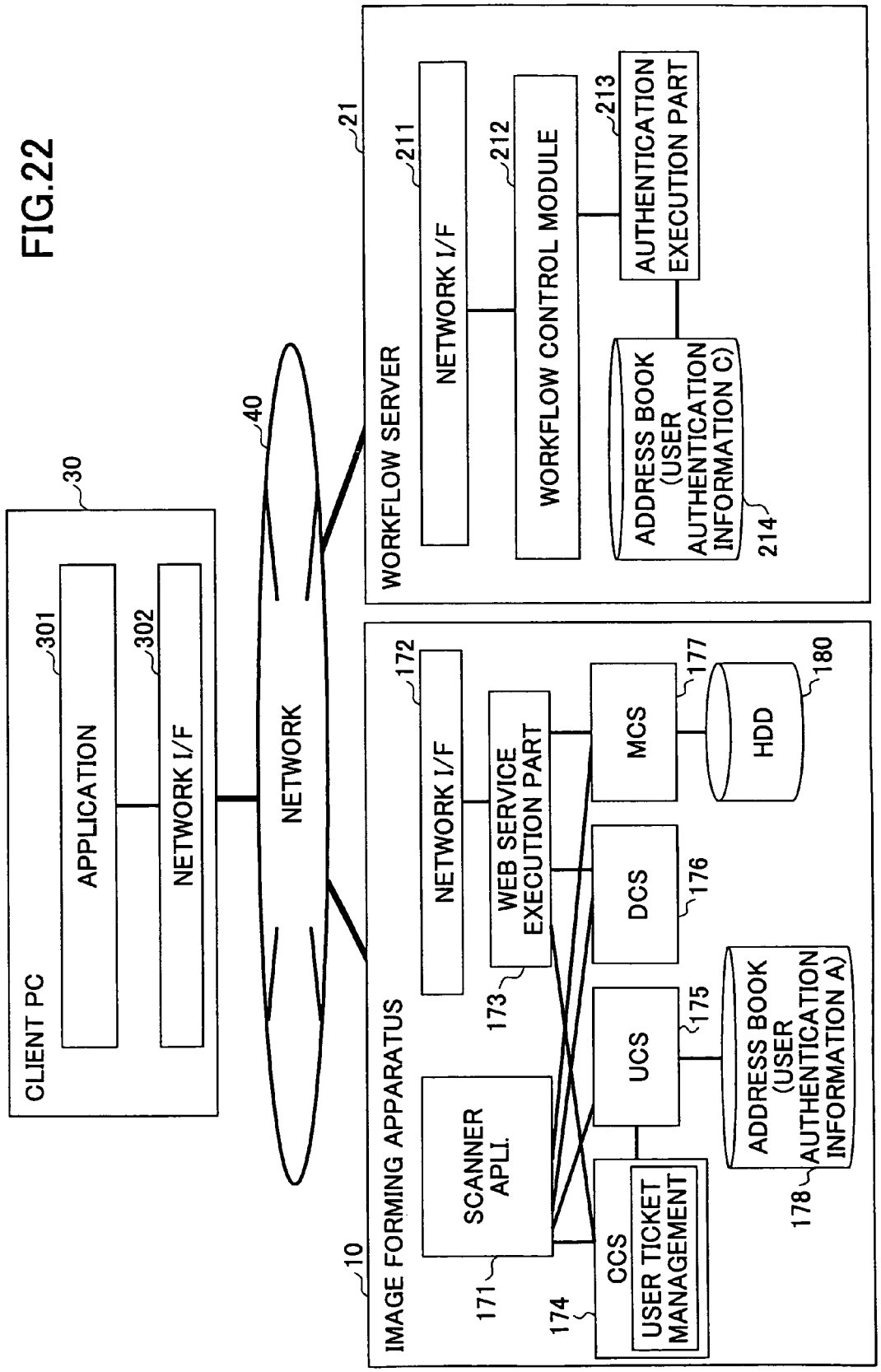
FIG. 22 is a block diagram of another embodiment of a system for realizing the user authentication method of the present invention.

FIG. 22 is a block diagram of another embodiment of a system for realizing the user authentication method of the present invention. The system shown in FIG. 22 is an example in which the authentication information corresponding table is not provided and an address book common for the image forming apparatus 10 and the workflow server 21 is used. In the system of FIG. 22, the address book 178 of the image forming apparatus 10 is synchronized with the address book 214 of the workflow server 21 so that the authentication information [A] of the image forming apparatus 10 becomes the same as the authentication information [C] of the workflow server 21. Except for several parts, the system shown in FIG. 22 is the same as the system shown in FIG. 19, and the same reference numerals are assigned to the corresponding components.

In each of the systems shown in FIGS. 19-22, the image forming apparatus 10, the workflow server 21, the client PC 30 and the directory server 50 can perform data communication via the network I/F (172, 211, 302, and 501).

Operations of the systems shown in FIGS. 19-22 are the same as those of the systems shown in FIGS. 6-9 except for several parts. More particularly, the name of a request from the DCS 176 of the image forming apparatus 10 to the workflow control module of the workflow server 21 shown in FIG. 23 is different.

Figure 23:
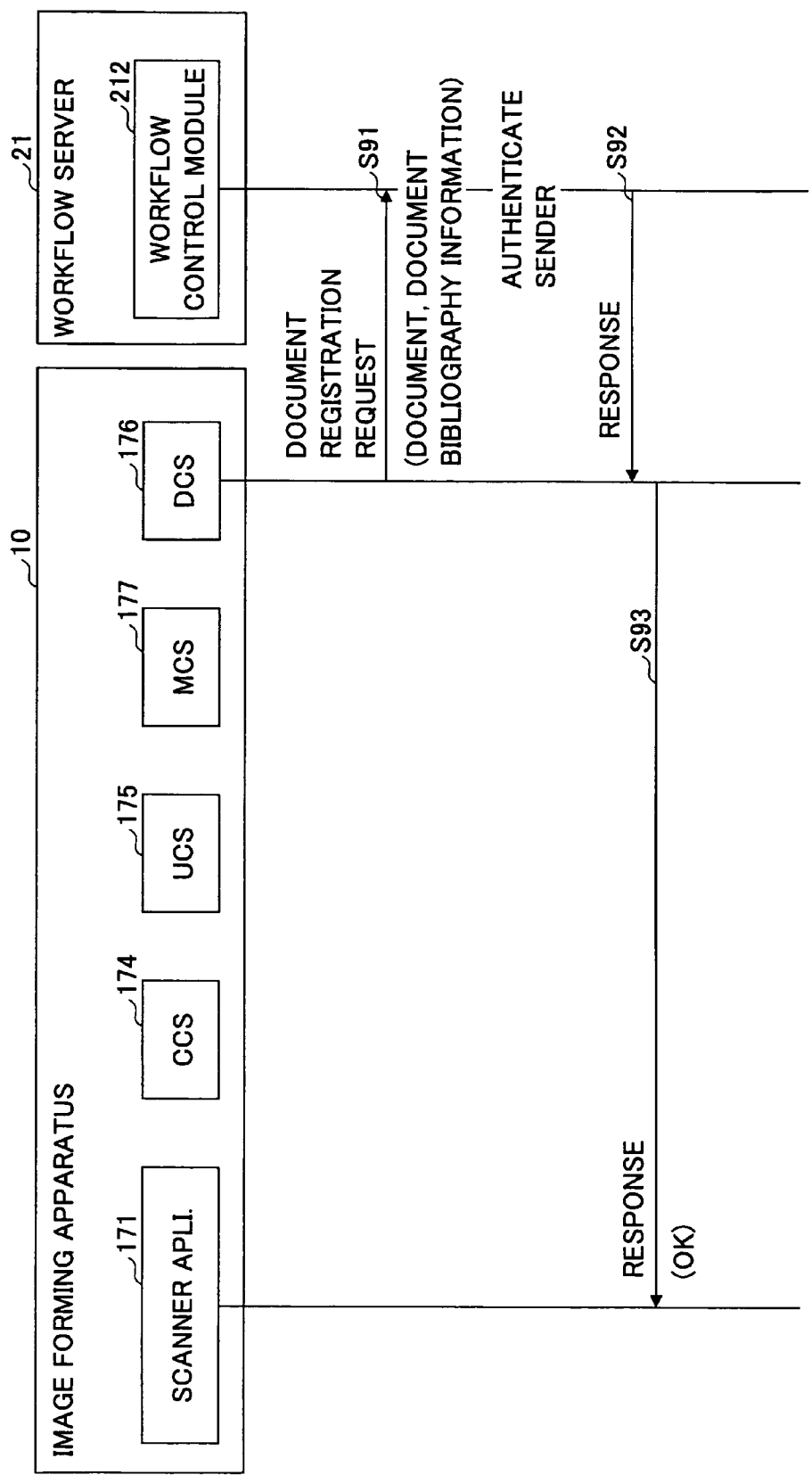
FIG. 23 is a sequence diagram of a document registration process performed between the image forming apparatus and the workflow server.

FIG. 23 is a sequence diagram of a document registration process performed between the image forming apparatus and the workflow server. The step S91 in FIG. 23 corresponds to each of steps S24 and S38 in FIGS. 12 and 13.

In step S91, the DCS 176 sends a document registration request including the document and the document bibliography information to the workflow control module 212 of the workflow server 21 corresponding to the destination ID.

The workflow control module 212 of the workflow server 21 obtains authentication information from the document bibliography information included in the document registration request, and performs user authentication using the authentication information. When the authentication information is encrypted, the workflow control module 212 performs user authentication after decrypting the authentication information. After the authentication is successfully completed, the workflow control module 212 sends a response for the document registration request of the step S91 to the DCS 176 of the image forming apparatus 10 in step S92. In step S93, the DCS 176 reports a document registration OK to the scanner application 171.

Accordingly, like the systems shown in FIGS. 6-9, the systems shown in FIGS. 19-22 can perform processes from user login to obtaining address book shown in FIG. 10, processes for obtaining the address book from the distribution server shown in FIG. 11, processes from document generation to document distribution shown in FIGS. 12 and 13, processes from session start to obtaining address book shown in FIG. 15, processes from document selection to document distribution shown in FIGS. 16 and 17 and processes for registering the encryption key shown in FIG. 18.

The present invention is not limited to the specifically disclosed embodiments, and variations and modifications may be made without departing from the scope of the present invention.

The present application contains subject matter related to Japanese patent application No. 2004-292813, filed in the JPO on Oct. 5, 2004, and Japanese patent application No. 2005-282063, filed in the JPO on Sep. 28, 2005, the entire contents of which are incorporated herein by reference.

What is claimed is:

1. A service providing system comprising an information processing apparatus and a service providing server, each having an authentication mechanism, that are connected via a network, wherein the information processing apparatus and the service providing server provide a service in response to a request by an authenticated user, the service providing system comprising:

the information processing apparatus including
a first information obtaining unit configured to obtain authenticated information identifying the user when the user is authenticated by the authentication mechanism of the information processing apparatus, the authentication of the user being determined based on information processing apparatus authentication information received from the user; and
a process request unit configured to send a process request to the service providing server including the authenticated information and information for checking the information processing apparatus; and the service providing server including
a second information obtaining unit configured to obtain the authenticated information and the information for checking the information processing apparatus included in the process request in response to receiving the process request from the information processing apparatus;
a memory configured to store an authentication information corresponding table, which stores the information processing apparatus authentication information and service providing server authentication information in association with the user;
a third information obtaining unit configured to obtain the service providing server authentication information for performing authentication of the user in the service providing server from the authentication information corresponding table, based on the authenticated information, after authentication for the information processing apparatus is successfully completed using the information for checking the information processing apparatus; and
a process execution unit configured to perform a process corresponding to the process request after authentication is successfully completed by the authentication mechanism of the service providing server using the service providing server authentication information obtained from the authentication information corresponding table stored in the memory of the service providing server.

2. The service providing system as claimed in claim 1, wherein the process request unit of the information processing apparatus includes information for identifying the user into the process request as the authenticated information.

3. A service providing server having an authentication mechanism, the service providing server being configured to provide a service in response to a request by an authenticated user received from the authenticated user, the service providing server comprising:
- a first information obtaining unit configured to obtain authenticated information identifying the user and information for checking an information processing apparatus included in a process request in response to receiving the process request from the information processing apparatus when the user is authenticated by an authentication mechanism of the information processing apparatus based on information processing apparatus authentication information received from the user;
- a memory configured to store an authentication information corresponding table, which stores the information processing apparatus authentication information and service providing server authentication information in association with the user; and
- a second information obtaining unit configured to obtain the service providing server authentication information for performing authentication of the user in the service providing server from the authentication information corresponding table, based on the authenticated information, after authentication for the information processing apparatus is successfully completed using the information for checking the information processing apparatus; and
- a process execution unit configured to perform a process corresponding to the process request after authentication is successfully completed by the authentication mechanism of the service providing server using the service providing server authentication information obtained from the authentication information corresponding table stored in the memory of the service providing server.

4. A service providing method in a service providing system comprising an information processing apparatus and a service providing server, each having an authentication mechanism, that are connected via a network, wherein the information processing apparatus and the service providing server provide a service in response to a request by an authenticated user, the method comprising:
- obtaining, by the information processing apparatus, authenticated information identifying the user when the user is authenticated by the authentication mechanism of the information processing apparatus, the authentication of the user being determined based on information processing apparatus authentication information received from the user;
- sending, by the information processing apparatus, a process request to the service providing server including the authenticated information and information for checking the information processing apparatus;
- obtaining, by the service providing server, the authenticated information and the information for checking the information processing apparatus included in the process request in response to receiving the process request from the information processing apparatus;
- obtaining, by the service providing server, service providing server authentication information for performing authentication of the user in the service providing server from an authentication information corresponding table, based on the authenticated information, after authentication for the information processing apparatus is successfully completed using the information for checking the information processing apparatus, wherein the authentication information corresponding table stores the information processing apparatus authentication information and the service providing server authentication information in association with the user and is stored in the service providing server; and
- performing, by the service providing server, a process corresponding to the process request after authentication is successfully completed by the authentication mechanism of the service providing server using the service providing server authentication information obtained from the authentication information corresponding table stored in the service providing server.

5. The service providing method as claimed in claim 4, wherein the sending comprises:
- sending, by the information processing apparatus, a process request including information for identifying the user as the authenticated information.

6. The service providing system as claimed in claim 1, wherein
- the service providing server includes the authentication mechanism configured to validate the obtained service providing server authentication information.

7. The service providing server as claimed in claim 3, further comprising:
- the authentication mechanism configured to validate the obtained service providing server authentication information.

8. The service providing method as claimed in claim 4, further comprising:
- validating, by the authentication mechanism of the service providing server, the obtained service providing server authentication information.

* * * * *